United States Patent
Dubey

(10) Patent No.: US 12,136,050 B2
(45) Date of Patent: *Nov. 5, 2024

(54) SYSTEM AND METHODS FOR PREDICTION COMMUNICATION PERFORMANCE IN NETWORKED SYSTEMS

(71) Applicant: THE BANK OF NEW YORK MELLON, New York, NY (US)

(72) Inventor: Vinay Dubey, Edison, NJ (US)

(73) Assignee: THE BANK OF NEW YORK MELLON, New York, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/959,939

(22) Filed: Oct. 4, 2022

(65) Prior Publication Data

US 2023/0196218 A1 Jun. 22, 2023

Related U.S. Application Data

(63) Continuation of application No. 17/331,259, filed on May 26, 2021, now Pat. No. 11,488,040, which is a
(Continued)

(51) Int. Cl.
*G06Q 10/063* (2023.01)
*G06F 11/34* (2006.01)
(Continued)

(52) U.S. Cl.
CPC ....... *G06Q 10/063* (2013.01); *G06F 11/3452* (2013.01); *G06F 18/256* (2023.01);
(Continued)

(58) Field of Classification Search
CPC ............ G06N 5/04; G06N 3/04; G06N 5/025; G06N 7/005; G06F 11/3452; G06K 9/6293
See application file for complete search history.

(56) References Cited

U.S. PATENT DOCUMENTS 6,073,116 A 6/2000 Boyle
6,952,683 B1 10/2005 Gerhard
(Continued)

FOREIGN PATENT DOCUMENTS

EP 3438899 A1 2/2019
WO 2014/075108 A2 5/2014

OTHER PUBLICATIONS

Extended European Search Report dated Oct. 13, 2022, issued in corresponding European Patent Application No. 22175451.8 (9 pgs.).
(Continued)

*Primary Examiner* — Alexey Shmatov
*Assistant Examiner* — Robert Bejcek, II
(74) *Attorney, Agent, or Firm* — Pillsbury Winthrop Shaw Pittman, LLP

(57) ABSTRACT

Systems for predicting communication settlement times across disparate networks store a first tier of a machine learning architecture comprising multiple machine learning models and an aggregation layer; store a second tier comprising rule sets for predicting settlement times; receive multiple data feeds corresponding to multiple communication data types; generate feature inputs based on the data feeds; input the feature inputs into the respective models to generate respective outputs; generate, using the aggregation layer, a third feature input based on the outputs; determine, based on the third feature input, a first rule set for predicting settlement times; receive a communication; predict a settlement time based on the first rule set; determine an aggregated communication load at a first time based on the settlement time; determine a performance availability requirement based on the load; determine a recommendation based on the performance availability requirement; and generate the recommendation based on the settlement time.

20 Claims, 12 Drawing Sheets

Related U.S. Application Data continuation-in-part of application No. 14/718,534, filed on May 21, 2015, now abandoned.

(60) Provisional application No. 62/001,861, filed on May 22, 2014.

(51) Int. Cl.

| | | |
|---|---|---|
| *G06F 18/25* | (2023.01) | |
| *G06N 3/04* | (2023.01) | |
| *G06N 5/025* | (2023.01) | |
| *G06N 5/04* | (2023.01) | |
| *G06N 7/01* | (2023.01) | |

(52) U.S. Cl.
CPC ............... *G06N 3/04* (2013.01); *G06N 5/025* (2013.01); *G06N 5/04* (2013.01); *G06N 7/01* (2023.01)

(56) References Cited

U.S. PATENT DOCUMENTS

| | | |
|---|---|---|
| 7,689,483 B2 | 3/2010 | Wu et al. |
| 7,882,337 B2 | 2/2011 | Rivera |
| 7,912,746 B2 | 3/2011 | Kline |
| 8,117,061 B2 | 2/2012 | May |
| 8,463,679 B2 | 6/2013 | Kaplan |
| 8,504,461 B1 | 8/2013 | Schulz |
| 8,688,448 B2 | 4/2014 | Peters |
| 8,700,527 B2 | 4/2014 | Dolphin |
| 8,768,809 B1 | 7/2014 | Cole |
| 2002/0116325 A1 | 8/2002 | Wise |
| 2002/0133455 A1 | 9/2002 | Howorka |
| 2003/0040994 A1 | 2/2003 | Ranzini |
| 2003/0200179 A1 | 10/2003 | Kwan |
| 2006/0047590 A1 | 3/2006 | Anderson |
| 2008/0147486 A1 | 6/2008 | Wu |
| 2010/0058349 A1 | 3/2010 | Diwakar |
| 2011/0072437 A1 | 3/2011 | Druyan |
| 2012/0148094 A1 | 6/2012 | Huang |
| 2012/0197670 A1 | 8/2012 | Poon |
| 2013/0066820 A1 | 3/2013 | Apte |
| 2014/0025324 A1 | 1/2014 | Padullaparthi |
| 2014/0025354 A1 | 1/2014 | Padullaparthi |
| 2014/0258505 A1 | 9/2014 | Liao |
| 2015/0339765 A1 | 11/2015 | Dubey |
| 2016/0092989 A1 | 3/2016 | Marsh |
| 2016/0267397 A1 | 9/2016 | Carlsson |
| 2018/0068083 A1 | 3/2018 | Cohen |
| 2019/0050245 A1 | 2/2019 | Bhageria |
| 2020/0136975 A1 | 4/2020 | Arora |

OTHER PUBLICATIONS

Thanh-Phuong Pham et al., "Predicting Workflow Task Execution Time in the Cloud Using a Two-Stage Machine Learning Approach", IEEE Transactions on Cloud Computing, vol. 8, No. 1, Jan.-Mar. 2020, pp. 256-268.

Extended European Search Report EP Application No. 1596055.0 dated Nov. 13, 2017.

International Preliminary Report on Patentability and Written Opinion of the International Searching Authority as issued in International Patent Application No. PCT/US2015/031967, dated Aug. 17, 2015.

Nadeem et al., Using Machine Learning Ensemble Methods to Predict Execution Time of e- Science Workflows in Heterogeneous Distributed Systems. IEEE Access 2019 (Year: 2019).

Munir et al., Network Scheduling and Compute Resource Aware Task Placement in Datacenters. IEEE/ACM Transactions on Networking, vol. 28, No. 6, Dec. 2020 (Year: 2020).

| | Forecast status | Posted | | | | | | | Cancelled |
|---|---|---|---|---|---|---|---|---|---|
| Decision tree | Day evaluated vs completion date | Day evaluated < Completion date | | | | | Day evaluated = Completion date | | |
| | Final value date vs completion date | Final value date < Completion date | | | | Final value date = Completion date | N/A | | N/A |
| | Day evaluated vs final value date | Day evaluated >= final value date | | Day evaluated < final value date | | N/A | N/A | | N/A |
| | Actual Position | IN | OUT | IN | OUT | IN | OUT | IN | OUT |
| | Decision evaluation | Right | Wrong | Wrong | Right | Wrong | Right | Wrong | Right |

SYSTEM AND METHODS FOR PREDICTION COMMUNICATION PERFORMANCE IN NETWORKED SYSTEMS

CROSS-REFERENCE TO RELATED APPLICATIONS

The present application is a Continuation Application of U.S. Ser. No. 17/331,259, filed May 26, 2021, which is a Continuation-In-Part Application of U.S. Ser. No. 14/718,534, filed May 21, 2015, now Abandoned, which claims priority to U.S. Provisional Application No. 62/001,861, filed May 22, 2014, the subject matter of each of which is incorporated herein by reference in entirety.

BACKGROUND

Computer performance many be affected by several factors. One such factor is the speed of the central processing unit ("CPU"). The speed of the CPU (or clock speed) is the frequency at which the processor executes instructions, or the frequency by which data is processed by the CPU. Another factor is the size of the random access memory ("RAM") and/or hard disk. RAM and/or hard disk may be used to store data that the computer is currently using (e.g., performing operations and/or otherwise processing). Generally, a large RAM size will mean faster computer performance, and a smaller RAM size will result in slower computer performance. Another factor is hard disk speed. Hard disk speed is defined as the rate at which material and content can be read and written on it. Generally, the higher the speed of the hard disk, the faster the performance of the computer, and vice versa. Other factors, such as the number of applications being run on a computer, the type of data being processed, and/or the size/speed of other computer components (e.g., graphics cards, etc.) may also affect performance.

Additionally, when transferring data between (or via a series of) computers, performance (on a network scale) may also be affected by several factors. These factors may include the number of devices on the network, the bandwidth of the transmission medium, the type of network traffic, network latency, and the number of transmission errors. Thus, when predicting when communications across networks will be completed, the system may need to base predictions on both computer performance and network performance, as well as numerous factors for each.

SUMMARY

Methods and systems are described herein for predicting when communications are settled (e.g., completed) across disparate computer networks, based on computer and network performance and communication load (e.g., amount, type, and/or requirement of communications being processed over the disparate computer networks). For example, when predicting when a transmission of a communication (e.g., a transaction request) will be settled (e.g., completed), the methods and systems may base the prediction on factors related to the performance of a requesting entity (e.g., a computer generating the communication), a network over which the communication is transmitted (e.g., one or more intermediate entities, networks, etc.), a receiving entity (e.g., a computer used to complete the communication), and/or an amount, type, and/or requirement of the communications being processed over the network.

However, while the numerous factors that may affect the completion of a communication are known, the use of these factors in predicting when a communication will be completed presents a technical challenge. For example, prior to transmitting a communication, the values for each of these factors is unknown. As a specific example, conventional systems have no mechanism for determining the hard disk speed of a computer receiving a communication. In fact, conventional systems have no mechanism for determining the particular computer or network route taken by the communication. Likewise, conventional systems have no mechanism for determining when communications may be sent (e.g., in instances when the system is the receiving entity) and/or an amount or type of communications that are currently presenting a load on the network.

Accordingly, the methods and systems described herein approach this problem in an unconventional way through the use of a two-tiered machine learning architecture. Specifically, as the exact value for each of the factors is unknown for any given communication, the system may instead determine a probability of the value for each factor at any given time. The system may then use these real-time probabilities to predict network conditions at any given time. These network conditions may then be used to determine a rule set for predicting when a communication will be completed. For example, the methods and systems create a two-tiered solution to overcoming the uncertainty in predicting communication settlement, in which a first tier predicts network conditions and a second tier provides a communication specific prediction of when settlement will occur.

This approach, however, raises its own technical challenges, as determining the probability of each value at any given time is difficult. This determination is made more difficult as the value of one factor may bias or otherwise mask the value of another factor. In order to overcome this novel technical challenge, the methods and systems independently determine a value for each factor independently of these others. The methods and systems perform these independent determinations through a series of machine learning models that generate predictions for the value of each factor in parallel. Specifically, the methods and systems receive data that corresponds to each factor through respective data feeds, in which each data feed corresponds to a different type of communication data. For example, each model may receive an independent feed of data related to a given factor. Additionally, in order to limit bias, the methods and systems may express the value of each factor as a probability.

The methods and systems may then aggregate the probabilities using an aggregation layer. The aggregation layer may function to generate an output that represents the current network conditions. The system may then select a rule set from a plurality of rule sets based on the current network conditions. The rule set may predict, based on the current network conditions and information about one or more communications (if available), when the one or more communications will be completed.

For example, by using in applying rules sets based on the current network conditions, the methods and systems may make predictions for given communications. Moreover, by determining current network conditions using the aforementioned machine learning architecture and then applying a rule set based on the network conditions and information about one or more communications (e.g., as opposed to a machine learning model that inputs feeds of data related to factors and outputs a prediction of completion for a given communication), the methods and systems prevent bias from entering the prediction of network communications based on communications that may be unknown to the system (e.g., communications in which the system is the receiving entity).

For example, in some embodiments, the system for processing performance prediction decisions includes one or more computer processors configured to execute one or more computer program modules. The program modules are configured to receive, via the one or more processors, a prediction for an account at a prediction timestamp. The modules are also configured to identify, via the one or more processors, a prediction rule using attributes from the prediction. Responsive to the prediction rule having a network trigger (e.g., one or more values of a certain probability) associated therewith, the modules are configured to retrieve, via the one or more processors, a network trigger time associated with the network trigger, compare, via the one or more processors, the prediction timestamp to the network trigger time, and apply, via the one or more processors, a prediction decision based on the comparison of the prediction timestamp and the network trigger time (e.g., a time of completion). Applying the prediction decision includes determining a confidence level (e.g., a probability) that a communication associated with the prediction will occur by a given time.

According to another embodiment, a computer implemented method for processing performance prediction decisions, implemented in a computer system comprising one or more processors configured to execute one or more computer program modules, includes receiving, via the one or more processors, a prediction for an account at a prediction timestamp, and identifying, via the one or more processors, a prediction rule using attributes from the prediction. Responsive to the prediction rule, having a network trigger associated therewith, the method includes retrieving, via the one or more processors, a network trigger time associated with the network trigger, comparing, via the one or more processors, the prediction timestamp to the network trigger time, and applying, via the one or more processors, a prediction decision based on the comparison of the prediction timestamp and the network trigger time. Applying the prediction decision comprises determining a confidence level that a communication associated with the prediction will occur by a given time.

In some aspects, methods and systems for predicting communication settlement times across disparate computer networks based on computer and network performance and communication load through the use of a two-tiered machine learning architecture are disclosed. For example, the system may receive a first data feed, wherein the first data feed corresponds to a first type of communication data. The system may receive a second data feed, wherein the second data feed corresponds to a second type of communication data. The system may generate a first feature input based on the first data feed. The system may generate a second feature input based on the second data feed. The system may input the first feature input into a first machine learning model to generate a first output, wherein the first machine learning model is trained to predict current performance conditions of the first type based on historic communication data of the first type, and wherein the first output indicates a first current network condition of the first type. The system may input the second feature input into a second machine learning model to generate a second output, wherein the second machine learning model is trained to predict current performance conditions of the second type based on historic communication data of the second type, and wherein the second output indicates a second current network condition of the second type. The system may generate, using an aggregation layer for the first machine learning model and the second machine learning model, a third feature input based on the first output and second output. The system may determine, based on the third feature input, a first rule set from a plurality of rule sets for predicting communication settlement times. The system may receive a first communication. The system may predict a first communication settlement time for the first communication based on the first rule set. The system may generate for display, on a user interface, a recommendation based on the first communication settlement time.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DISCUSSION OF THE DRAWINGS

Figure 3A:
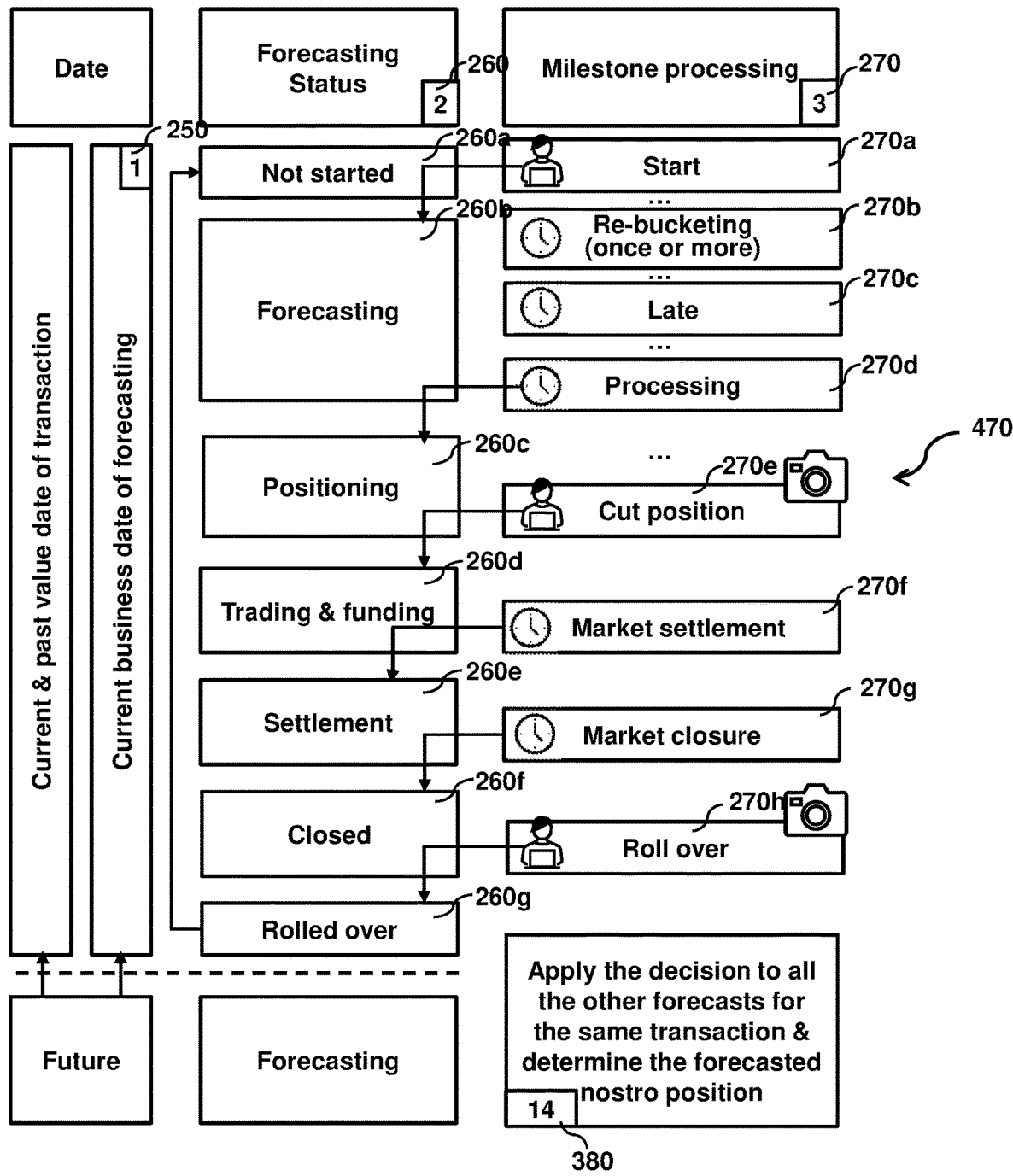
Figure 3B:
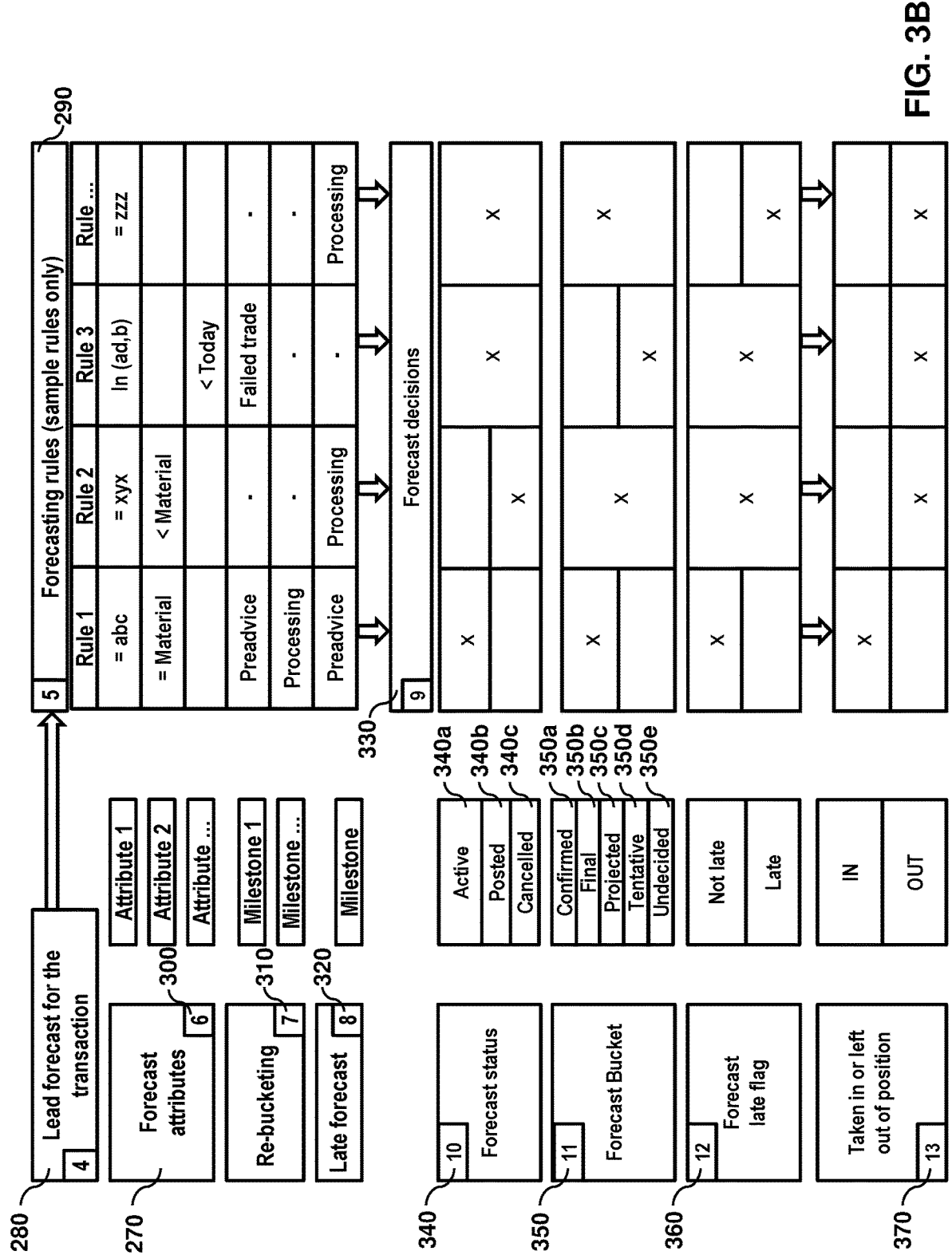
Figure 4:
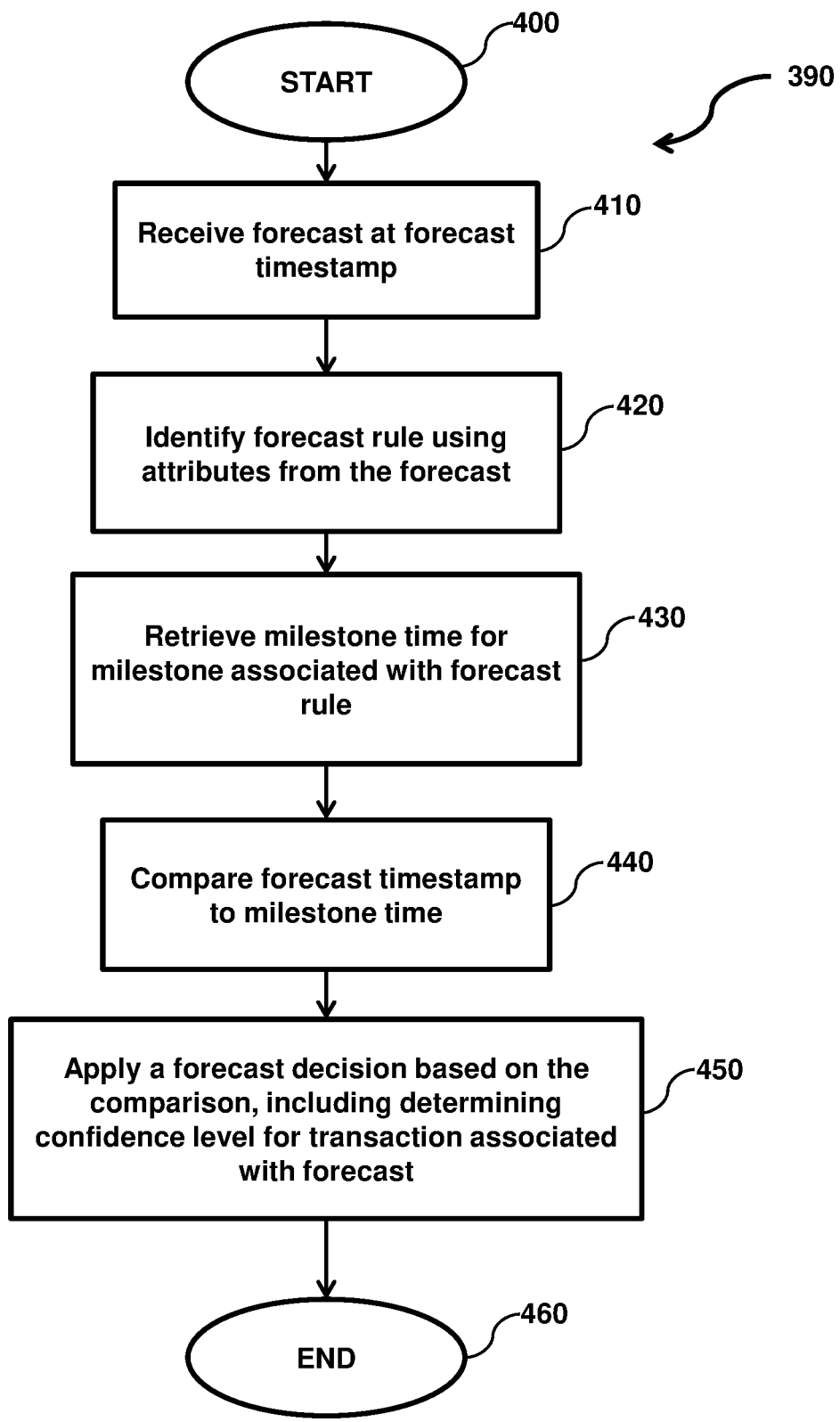
Figure 5A:
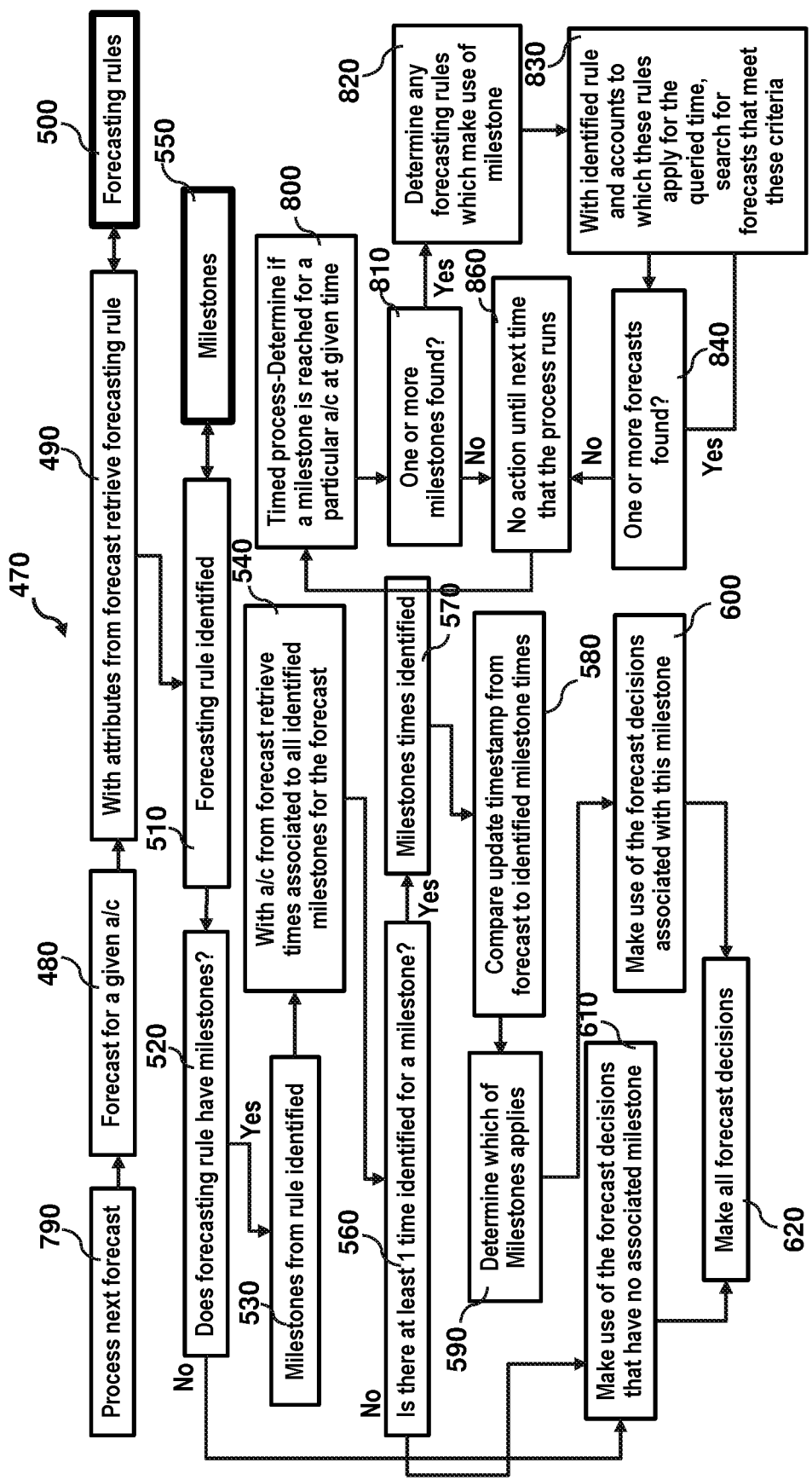
Figure 5B:
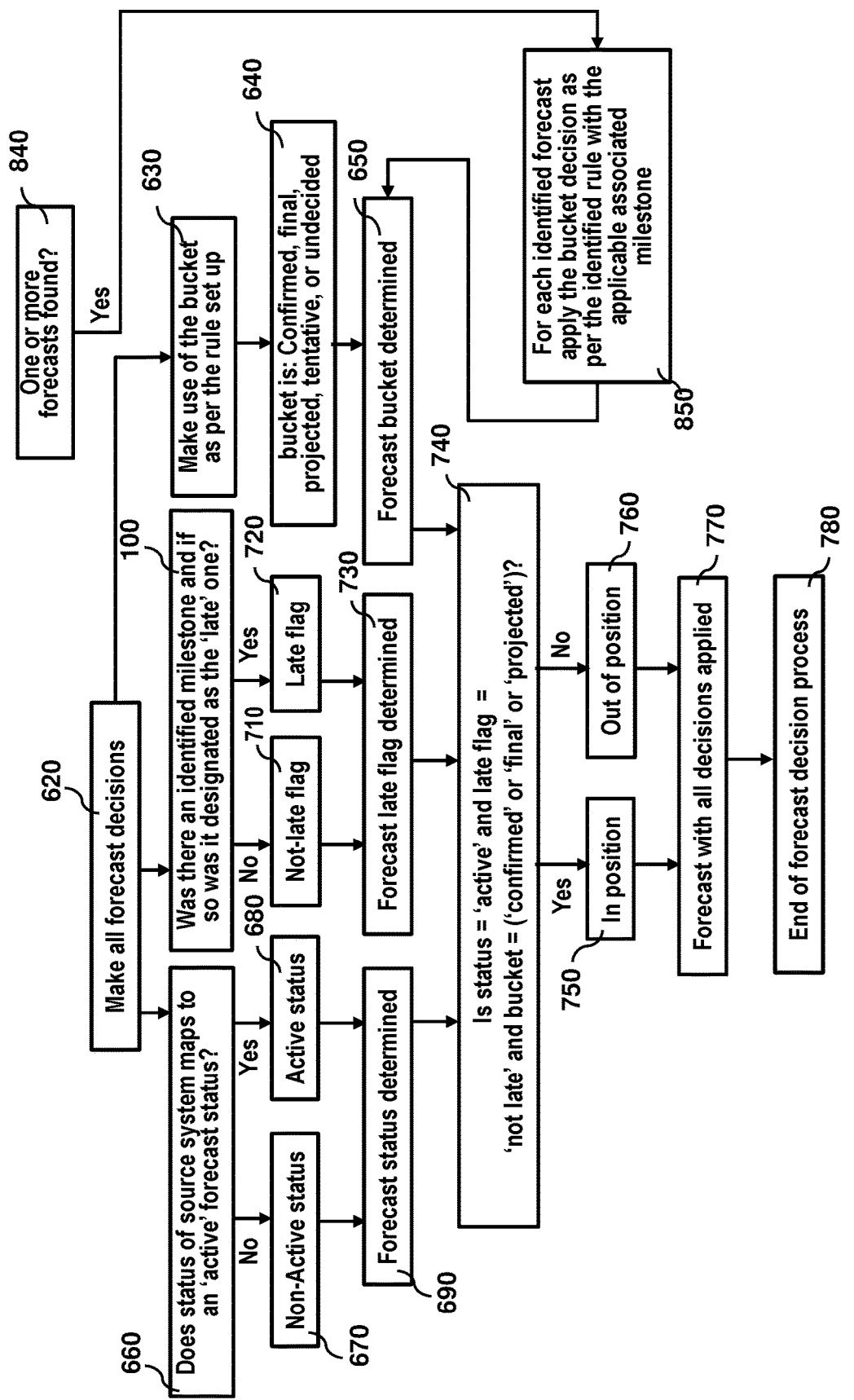
Figure 6A:
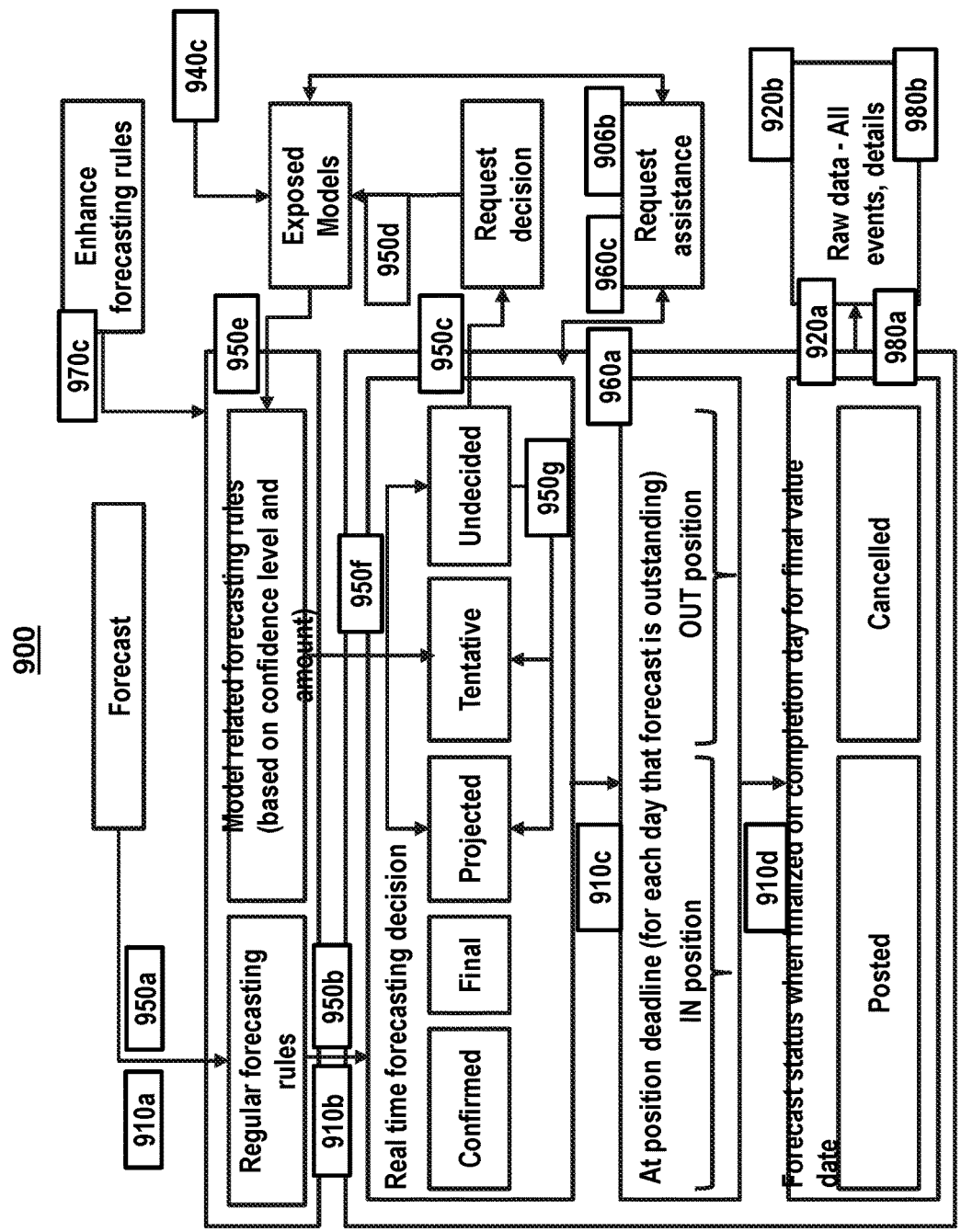
Figure 6B:
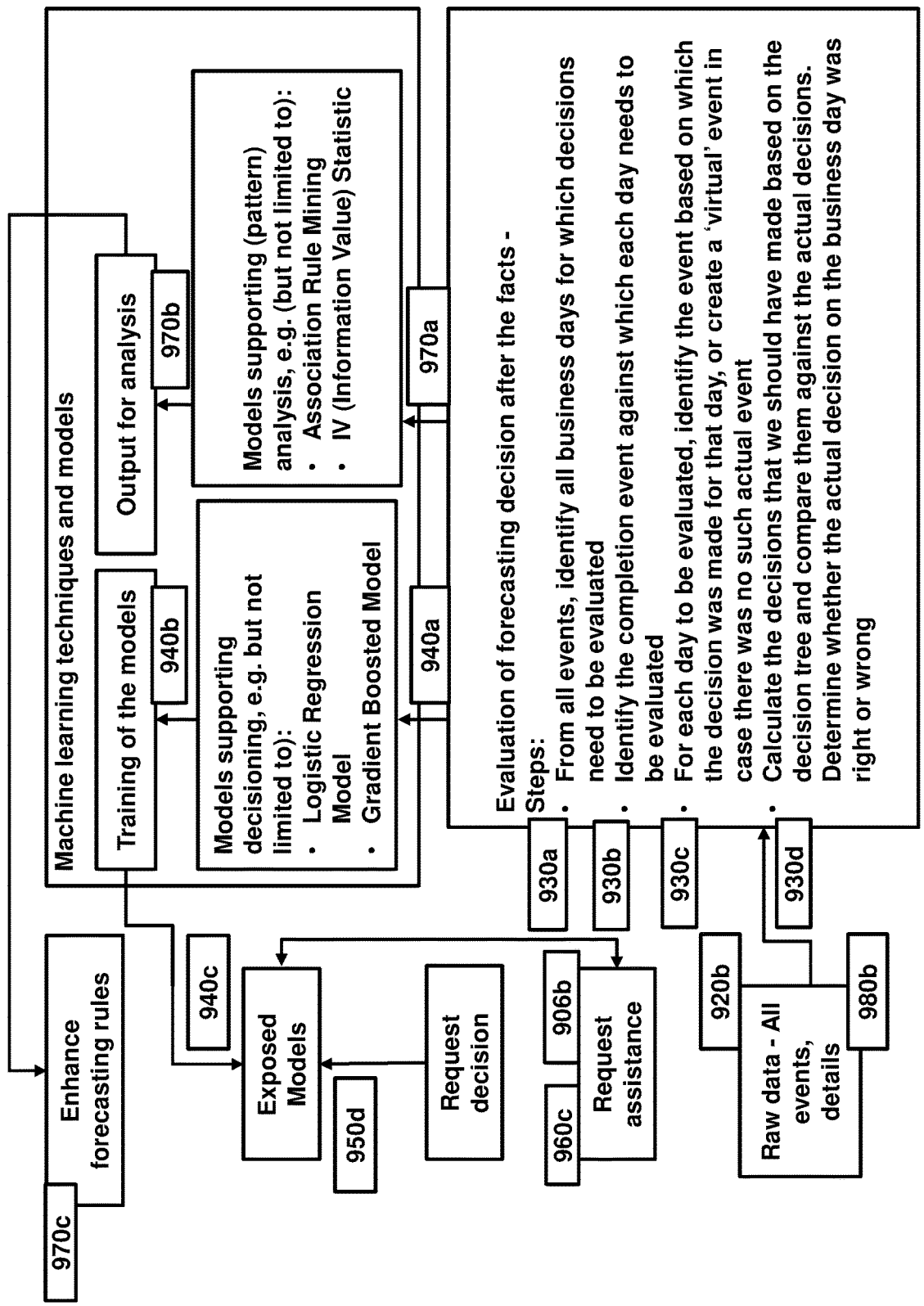
Figure 7:
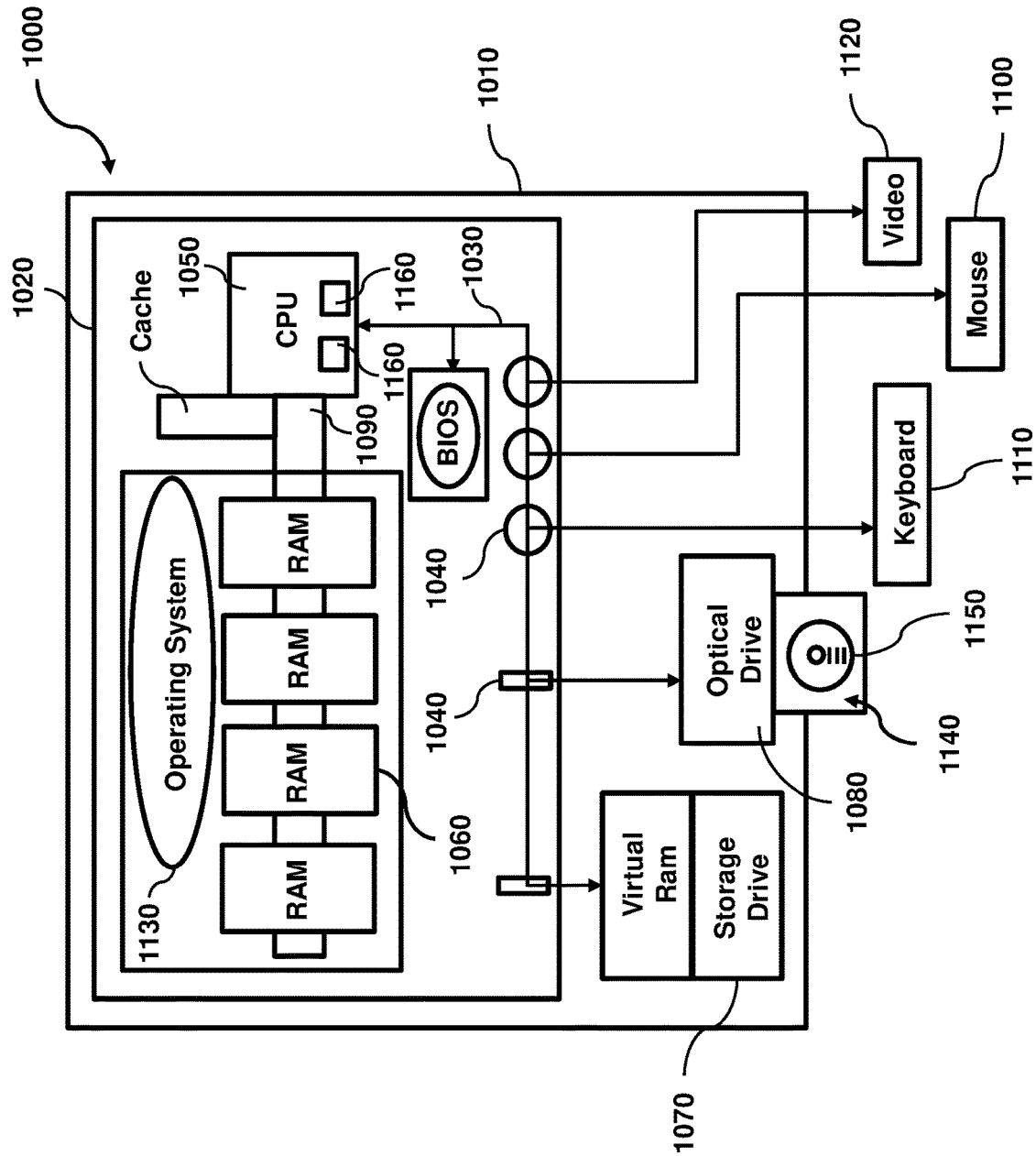
Figure 8:
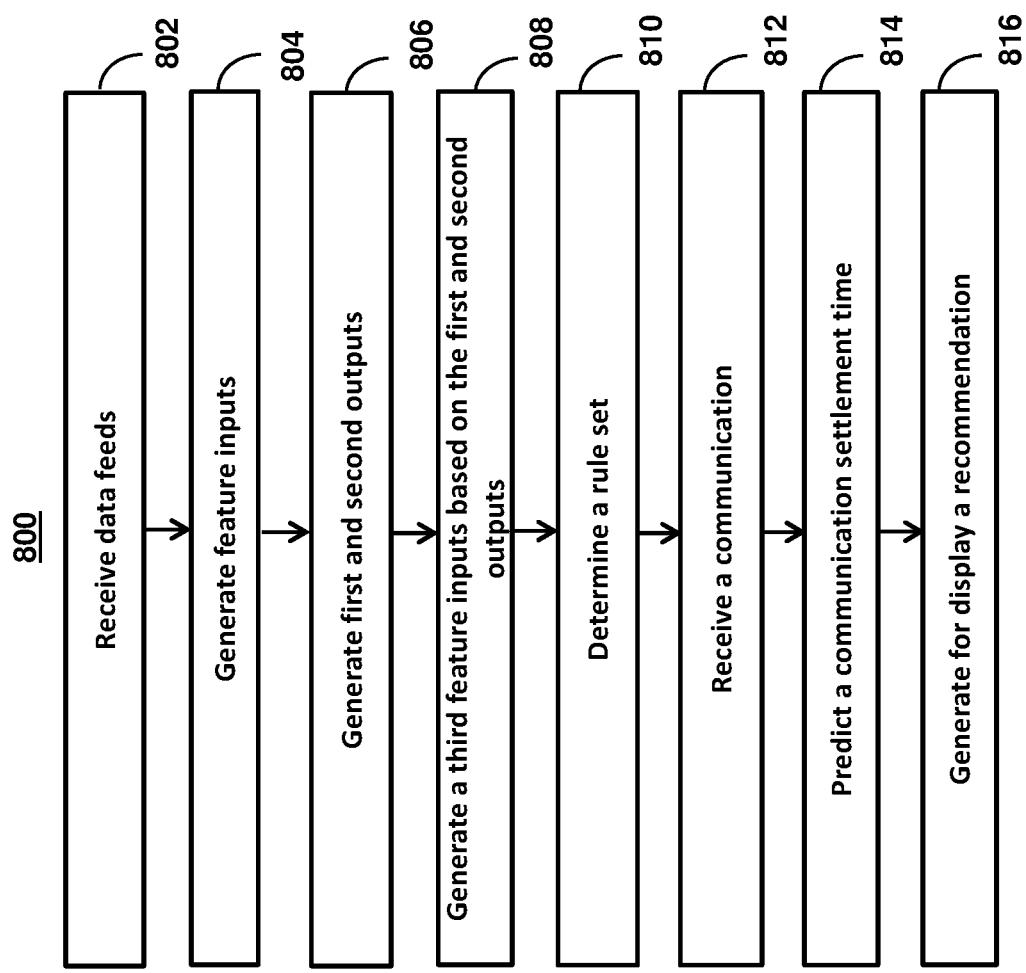

FIG. 3A-B illustrates an embodiment of a process flow for automated performance prediction decision-making, in some embodiments of the disclosure;

FIG. 4 illustrates an embodiment of a method for processing performance prediction decisions, in some embodiments of the disclosure;

FIG. 5A-B illustrates another embodiment of an automated performance prediction decision-making process, in some embodiments of the disclosure;

FIG. 6A-C illustrates an embodiment of a machine learning and prediction decision-making process, in some embodiments of the disclosure;

FIG. 7 illustrates an exemplary computer system configured to perform the functions of systems and methods described herein, in some embodiments of the disclosure; and FIG. 8 illustrates steps for predicting communication settlement times across disparate computer networks based on computer and network performance and communication load through the use of a two-tiered machine learning architecture, in some embodiments of the disclosure.

DETAILED DESCRIPTION

In the discussion of various embodiments and aspects of the system and method of this disclosure, examples of a processor may include any one or more of, for instance, a personal computer, portable computer, personal digital assistant (PDA), workstation, or other processor-driven device, and examples of network may include, for example, a private network, the Internet, or other known network types, including both wired and wireless networks.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience, and that such actions in fact result from computing devices, processors, controllers, or other devices executing the firmware, software, routines, or instructions.

Described herein is an exemplary system which may be implemented through computer software running in a processor to provide performance data analytics. This description is not intended to be limiting, but is merely provided to describe ways of accomplishing the functions associated with acting as a financial service provider on behalf of an asset owner or investor.

Figure 1:
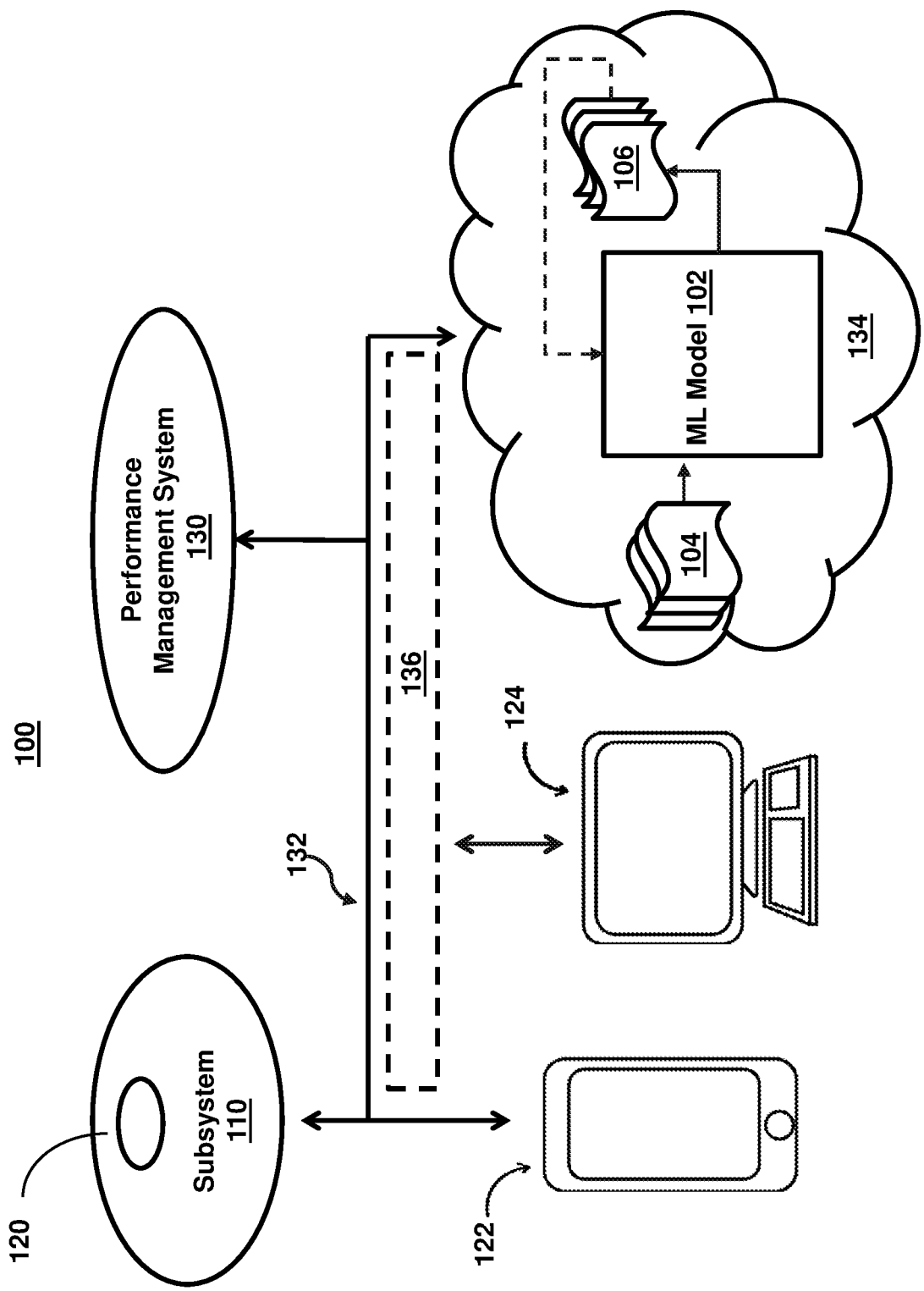
FIG. 1 illustrates a system for predicting communication settlement times across disparate computer networks based on computer and network performance and communication load through the use of a two-tiered machine learning architecture, in some embodiments of the disclosure.

FIG. 1 shows illustrative system components for predicting communication settlement times across disparate computer networks based on computer and network performance and communication load through the use of a two-tiered machine learning architecture, in accordance with one or more embodiments. As shown in FIG. 1, system 100 may include mobile device 122 and user terminal 124. While shown as a smartphone and personal computer, respectively, in FIG. 1, it should be noted that mobile device 122 and user terminal 124 may be any computing device, including, but not limited to, a laptop computer, a tablet computer, a hand-held computer, other computer equipment (e.g., a server), including "smart," wireless, wearable, and/or mobile devices. FIG. 1 also includes cloud components 134. Cloud components 134 may alternatively be any computing device as described above, and may include any type of mobile terminal, fixed terminal, or other device. For example, cloud components 134 may be implemented as a cloud computing system, and may feature one or more component devices. It should also be noted that system 100 is not limited to three devices. Users, may, for instance, utilize one or more devices to interact with one another, one or more servers, or other components of system 100. It should be noted, that, while one or more operations are described herein as being performed by particular components of system 100, those operations may, in some embodiments, be performed by other components of system 100. As an example, while one or more operations are described herein as being performed by components of mobile device 122, those operations may, in some embodiments, be performed by components of cloud components 134. In some embodiments, the various computers and systems described herein may include one or more computing devices that are programmed to perform the described functions. Additionally, or alternatively, multiple users may interact with system 100 and/or one or more components of system 100. For example, in one embodiment, a first user and a second user may interact with system 100 using two different components.

With respect to the components of mobile device 122, user terminal 124, and cloud components 134, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 1, both mobile device 122 and user terminal 124 include a display upon which to display data (e.g., conversational response, queries, and/or notifications).

Additionally, as mobile device 122 and user terminal 124 are shown as touchscreen smartphones, these displays also act as user input interfaces. It should be noted that in some embodiments, the devices may have neither user input interface nor displays, and may instead receive and display content using another device (e.g., a dedicated display device, such as a computer screen, and/or a dedicated input device, such as a remote control, mouse, voice input, etc.). Additionally, the devices in system 100 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes communication path 132. Communication path 132 may include the Internet, a mobile phone network, a mobile voice or data network (e.g., a 5G or LTE network), a cable network, a public switched telephone network, or other types of communications networks or combinations of communications networks. Communication path 132 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 134 may include model 102, which may be a machine learning model (e.g., as described in FIG. 3A-B). Model 102 may use one or more artificial intelligence models (including machine learning models, neural networks, etc.) referred to here collectively as "models." In some embodiments, model 102 may comprise a two-tiered machine learning architecture. For example, model 102 may comprise one or more machine learning models that form a first tier of a machine learning architecture and that may work in conjunction with a second tier, which may be hosted on performance management system 130.

Model 102 may take inputs 104 and provide outputs 106. The inputs may include multiple datasets, such as a training dataset and a test dataset. Each of the plurality of datasets (e.g., inputs 104) may include data subsets related to user data, historic data, and/or mulit-modal information. In some embodiments, outputs 106 may be fed back to model 302 as input to train model 102 (e.g., alone or in conjunction with user indications of the accuracy of outputs 106, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 102 may update its configurations (e.g., weights, biases, or other parameters) based on the assessment of its prediction (e.g., outputs 106) and reference feedback information (e.g., user indication of accuracy, reference labels, or other information). In a variety of embodiments, where model 102 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 102 may be trained to generate better predictions.

In some embodiments, model 102 may include an artificial neural network. In such embodiments, model 102 may include an input layer and one or more hidden layers. Each neural unit of model 102 may be connected with many other neural units of model 102. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 102 may be self-learning and trained, rather than explicitly programmed, and can perform significantly better in certain areas of problem solving, as compared to traditional computer programs. During training, an output layer of model 102 may correspond to a classification of model 102, and an input known to correspond to that classification may be input into an input layer of model 102 during training. During testing, an input without a known classification may be input into the input layer, and a determined classification may be output.

In some embodiments, model 102 may include multiple layers (e.g., where a signal path traverses from front layers to back layers). In some embodiments, back propagation techniques may be utilized by model 102 where forward stimulation is used to reset weights on the "front" neural units. In some embodiments, stimulation and inhibition for model 102 may be more free-flowing, with connections interacting in a more chaotic and complex fashion. During testing, an output layer of model 102 may indicate whether or not a given input corresponds to a classification of model 102 (e.g., a predicted communication settlement time).

In some embodiments, model 102 may predict alternative content. For example, the system may determine that particular characteristics are more likely to be indicative of a prediction. In some embodiments, the model (e.g., model 1302) may automatically perform actions based on outputs 106 (e.g., generate recommendations). In some embodiments, the model (e.g., model 102) may not perform any actions on a user's account and/or with respect to a communication.

In some embodiments, cloud components 134 may also include an aggregation layer. For example, in some embodiments outputs 106 (e.g., from one or more models such as model 102) may be aggregated using an aggregation layer. The aggregation layer may use Iterative Deep Aggregation ("IDA") and Hierarchical Deep Aggregation ("HAD"). For example, the aggregation layer for the first machine learning model and the second machine learning model may be used to generate a third feature input based on outputs from machine learning models.

System 100 also includes API layer 136, which may include and/or use information from the aggregation layer. In some embodiments, API layer 136 may be implemented on user device 322 or user terminal 324. Alternatively or additionally, API layer 136 may reside on one or more of cloud components 134. API layer 136 (which may be A REST or Web services API layer) may provide a decoupled interface to data and/or functionality of one or more applications. API layer 136 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 136 may use various architectural arrangements. For example, system 300 may be partially based on API layer 136, such that there is strong adoption of SOAP and RESTful Web-services, using resources like Service Repository and Developer Portal, but with low governance, standardization, and separation of concerns. Alternatively, system 300 may be fully based on API layer 136, such that separation of concerns between layers like API layer 136, services, and applications are in place.

In some embodiments, the system architecture may use a microservice approach. Such systems may use two types of layers: Front-End Layer and Back-End Layer where microservices reside, in this kind of architecture, the role of the API layer 136 may provide integration between Front-End and Back-End. In such cases, API layer 136 may use RESTful APIs (exposition to front-end or even communication between microservices). API layer 136 may use AMQP (e.g., Kafka, RabbitMQ, etc.). API layer 136 may use incipient usage of new communications protocols such as gRPC, Thrift, etc.

In some embodiments, the system architecture may use an open API approach. In such cases, API layer 136 may use commercial or open source API Platforms and their modules. API layer 136 may use developer portal. API layer 136 may use strong security constraints applying WAF and DDOS protection, and API layer 136 may use RESTful APIs as standard for external integration.

In some embodiments, FIG. 1 schematically illustrates a system 100 between various subsystems 110 of a financial services provider. As shown, cash balance and communication data 120 associated with each of the subsystems 110 may be relayed (e.g., copied, transmitted, or otherwise provided to) a performance management system 130 that is part of the system 100. In an embodiment, such cash balance and communication data 120 may be relayed to or otherwise gathered by the performance management system 130 on a real-time basis. In some embodiments, the cash balance and/or communication data 120 may be relayed to or otherwise gathered by the performance management system 130 on a periodic or intermittent basis, including but not limited to hourly, after a set number of minutes, and/or upon new cash balance and/or communication data 120 being received by the financial services provider. It may be understood that the system 100 may include coupling computer systems or processors associated with each of the financial services provider subsystems 110, and/or other computer systems servicing the subsystems 110, either at or remote to the financial services provider.

For example, performance management system 130 may be configured for a financial services provider to monitor liquidity data on an enterprise level, facilitating holistic management of liquidity at the financial services provider. According to an embodiment, a system for processing liquidity forecasting decisions includes one or more computer processors configured to execute one or more computer program modules. The program modules are configured to receive, via the one or more processors, a forecast for an account at a forecast timestamp. The modules are also configured to identify, via the one or more processors, a forecast rule using attributes from the forecast. Responsive to the forecast rule having a milestone associated therewith, the modules are configured to retrieve, via the one or more processors, a milestone time associated with the milestone, compare, via the one or more processors, the forecast timestamp to the milestone time, and apply, via the one or more processors, a forecast decision based on the comparison of the forecast timestamp and the milestone time. Applying the forecast decision includes determining a confidence level that a transaction associated with the forecast will occur by a given time.

According to another embodiment, a computer implemented method for processing liquidity forecasting decisions, implemented in a computer system comprising one or more processors configured to execute one or more computer program modules, includes receiving, via the one or more processors, a forecast for an account at a forecast timestamp, and identifying, via the one or more processors, a forecast rule using attributes from the forecast. Responsive to the forecast rule having a milestone associated therewith, the method includes retrieving, via the one or more processors, a milestone time associated with the milestone, comparing, via the one or more processors, the forecast timestamp to the milestone time, and applying, via the one or more processors, a forecast decision based on the comparison of the forecast timestamp and the milestone time. Applying the forecast decision comprises determining a confidence level that a transaction associated with the forecast will occur by a given time.

In an embodiment, the cash balance and/or communication data 120 may be understood as that data which describes financial performance (or liquidity) for the financial services provider. It may be appreciated that the performance management system 130, by accumulating cash balance and/or communication data 120 in a common system, may facilitate making automated decisions, or assist user decisions for purposes of managing actual and prediction performance (e.g., liquidity). Such decisions may be useful in optimizing end-of-day cash positions for the financial services provider.

In an embodiment, a performance decision (e.g., relating to a liquidity decision) may be made before the end of the local business day (i.e., before the other bank's deadline or market closure), where the prediction nostro position may typically be managed down to approximately a zero balance. In an embodiment, one such performance decision may be a funding decision. In an embodiment, a funding decision may comprise a performance analyst or other party moving the prediction cash balance to/from another account where the cash is concentrated. In an embodiment, the cash may be moved to the concentration account in case of a "long" balance, i.e. excess cash. In an embodiment, the cash may be moved from the concentration account to the nostro in case of a "short" balance (i.e. a shortfall of cash). In an embodiment, another type of decision may include an investment decision. In an investment decision, typically a trader from Corporate Treasury may decide to not invest at least a portion of their cash position and/or may trade with another financial institution to either borrow from them in order to cover a short balance, or lend to them in order to place a long balance.

Figure 2:
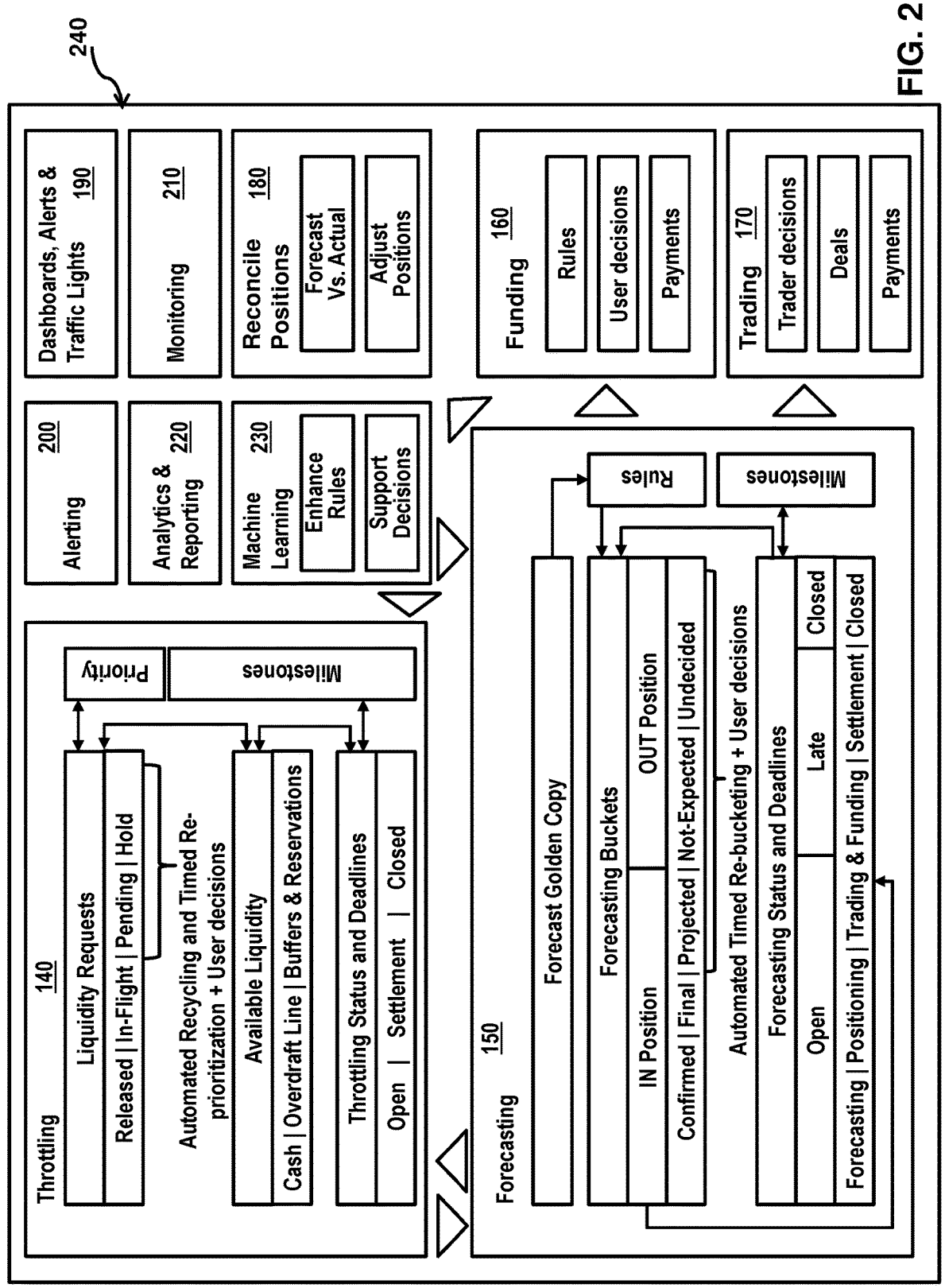
FIG. 2 illustrates a functional overview of an embodiment of the performance management system, in some embodiments of the disclosure.

FIG. 2 illustrates a functional overview of an embodiment of the performance management system 130. For example, FIG. 2 may illustrate recommendations and/or functionalities that may be generated based on communication settlement time. As described herein, in various embodiments the performance management system 130 may be configured to provide throttling functionality 140, prediction functionality 150, funding functionality 160, trading functionality 170, and/or reconciliation functionality 180. It may be appreciated that such functionalities may support the various subsystems 110 of the financial services provider across a plurality of currencies in some embodiments. In some embodiments, access to some of the functionalities, or portions thereof, may be limited or permitted based on user permission controls (e.g., a user login associated with the computer systems used by users to access the performance management system 130). As described in greater detail below, in an embodiment the users may each be associated with different tasks at the financial services provider. For example, a control user may be tasked with throttling communications, monitoring of the clearing channels and monitoring the technical health of the application and its interfaces. In an embodiment, a performance analyst user may be tasked with prediction, funding and next day reconciliation. In an embodiment, a trader user may be tasked with covering the financial service provider's cash positions in the market. In an embodiment, a client services user may be tasked with monitoring their client's activity and associated performance. In an embodiment, an operations user may support the prediction decision making process, and provide non-systemic predictions.

As described in greater detail below, in an embodiment, the throttling functionality 140 may comprise the algorithms and software programs configured to regulate payment flow to cash clearing channels or correspondent banks associated with or otherwise networked to the financial services provider (e.g., regulating the payment flow to the market, as a payment scheduler). Such regulation and throttling of the throttling functionality 140 may vary such payment flows based on the available performance. In an embodiment, the prediction functionality 150 may project or predict a likely closing balance associated with a correspondent or clearing channel at a given time (e.g., at the end of the business day). In an embodiment, prediction may be the process of projecting the daily closing balance for a cash account. It may be appreciated that in an embodiment the daily closing balance may be projected as denominated in any currency. While prediction is typically done for a nostro account, i.e. an account held with another bank, it can also be performed for a client account or any other type of account. In an embodiment, prediction may include actual numbers which have already been confirmed by the institution where the account is held, i.e. the central bank clearing or correspondent bank. In an embodiment, prediction may also consider the non-confirmed communications of which the users (e.g., the performance analyst users) are aware, but that have not yet occurred, at least in part.

In an embodiment, the funding functionality 160, and the trading functionality 170 may together be configured to allow the financial services provider to manage positions by concentrating cash on a number of accounts, and advise traders what amounts should be considered for lending the excess cash of the financial services provider, or borrowing for a shortfall of cash of the financial services provider. In an embodiment, the reconciliation functionality 180 may be configured to compare prediction positions against actual balances associated with a correspondent or clearing channel. Such comparison may be at a later date (e.g., after the initial business date or another time associated with the prediction functionality 150). It may be appreciated that in some embodiments, supporting features may be implemented to support the various functionalities described herein, including but not limited to dashboard user interfaces and/or traffic light user interfaces 190, alerting 200, monitoring 210, tangential analytics 220, and machine learning features 230, as discussed in greater detail below. It may be appreciated that, as understood herein, the business date may be the date for which the prediction is done. In many embodiments the business date may be the same as the calendar day. In some embodiments, and in some markets, however, the business date may be one or two days ahead of the current calendar day, which means that prediction happens for a future date. In an embodiment, the prediction position for a given value date may include communications with a value date equal or less than the business date.

It may be appreciated that in an embodiment, a prediction position may be the opening balance for the day, (e.g., the previous day's closing balance) plus any prediction communications which result in cash coming into the financial services provider, minus any prediction communications which result in cash going out from the financial services provider. In various embodiments, communications which result in cash coming into the financial services provider may include the buy side of a foreign exchange trade, a payment from another bank, the delivery of securities versus payment (DVP), or so on. In various embodiments, prediction communications which result in cash going out may include, for example, the sell side of a foreign exchange trade, a payment to another bank, the receipt of securities versus payment (RVP), or so on.

As used herein, "communication" may represent any sort of financial communication, including but not limited to a payment, a receipt of funds, a securities settlement, a dividend payment, a foreign exchange, a loan, and/or a letter of credit. In an embodiment, these communications may be processed on a variety of banking systems, such as payment systems, securities settlement systems, trading systems, portfolio services systems, trade finance systems, and so on. In an embodiment, communications may post to accounting systems which may be configured to capture associated debits and credits based on calculated account balances. In an embodiment, a general ledger system may be used to produce the balance sheet for the financial services provider. It may be appreciated that by capturing communications from all of the financial services provider's relevant systems in real time, the data may be considered for prediction and establishing a prediction position. In an embodiment, communications that cannot be captured for whatever reason may be noted to prompt manual adjustment of the position, so that they may be included, if applicable.

In an embodiment, the throttling functionality 140 may facilitate management of the flow of payment communications into various cash clearing channels, including but not limited to the Fed (US), Target2 (Europe), Chaps (UK), and Chats (Hong Kong). In an embodiment, the throttling functionality 140 may be configured to reserve performance for future communications, such as those not yet received by the performance management system 130. In an embodiment, the throttling functionality 140 may be configured to schedule payments to parties outside of the financial services provider, or may be configured to clear or settle accounts against a cash balance or a predefined intraday credit limit. In an embodiment where the throttling functionality 140 is configured to clear or settle against a predefined credit limit, such limit may be calculated based on collateral lodged with a central bank or clearing system. It may be appreciated that in some embodiments, clearing channels may require members to meet throughput requirements based on payment value and volume, so as to ensure that sufficient performance remains in the market(s).

In an embodiment, the throttling functionality 140 may be configured to provide users at the financial services provider (e.g., direct or indirect users of the performance management system 130 and/or the subsystems 110) with real-time (or substantially real time) information regarding the pending payments queue, payment execution, intraday balances, and/or available performance, so that such users may make informed decisions. In an embodiment, the performance management system 130 may be configured to automatically release payment requests as long as there is available performance. It may be appreciated that the throttling functionality 140 may delay or prevent such automatic releases of payments in some embodiments. In an embodiment, available performance may be monitored periodically or continuously, and may provide appropriate alerts to the user if payments remain pending, or if available performance is below a threshold amount (e.g., the amount for automatically releasing payments). In an embodiment, a user interface linked to the performance management system 130 and/or the subsystems 110 may allow users to optionally release pending payments manually, or hold the pending payments for release at a later stage, such as when additional performance is available. In an embodiment, certain user accounts may have additional permissions over other user accounts, and may, for example, release payments that exceed the available performance and/or performance limits.

It may be appreciated that in some embodiments the throttling functionality 140 may be configured to utilize a clearing channel profile, which may set default values on a daily basis, and may in some embodiments make intraday changes to regulate payment flow. In an embodiment, the throttling functionality 140 may be selectively enabled or disabled, and may automatically release against cash plus potentially some or all of an overdraft line. In an embodiment, the throttling functionality 140 may be configured to selectively release all transfers/payments, require manual approval of transfer/payments, or suspend all payments (e.g., until a condition is met, such as passage of time or performance becomes available). In an embodiment a throttling functionality 140 may be configured to activate or deactivate (e.g., selectively throttle payments or not), or modify its behavior, based on certain conditions, such as closing for certain message types, closing for the remainder of the day, or entering a settlement mode. In an embodiment, the throttling functionality 140 may have defined or modifiable limits, which may define how much of an overdraft line may be accessed during automatic release. In an embodiment, target balances may be established, such that the throttling functionality 140 may allow users to auto-release payments as long as the balance threshold (which can be either positive, negative, or zero) isn't exceeded or surpassed. According to some embodiments, buffers or reservations may be implemented in the throttling functionality 140, which may hold performance for future communications. If the future communication is known, certain performance may be reserved specifically for the communication. If the future communication is not known, a buffer may be utilized for unallocated performance. In some embodiments, pending payments may be recycled for release after either performance increases, or the status of the throttling functionality 140 changes. In various embodiments, performance can increase because additional credits are received by the financial services provider, because a limit is increased, buffers are lowered, or so on. In some embodiments, the throttling functionality 140 may be configured so that users may assign payment priority to certain requests (e.g., based on rule sets), and may, in an embodiment, modify priority assignments while requests are pending.

In an embodiment, the prediction process 150 may be configured to predict a likely closing balance for an account with a correspondent bank or clearing system before any applicable deadlines, in time to cover the financial service provider's projected balances. In an embodiment, the prediction process 150 may recommend whether a prediction should be taken into or left out of position. It may be appreciated that if a prediction is "taken in position," then it is included in the metric that is used for funding or investing. On the other hand, if a prediction is "left out of position," then it is excluded from the metric used for funding or investing.

For example, if a client expects another party to wire them funds, there is no guarantee of the transfer until the funds are confirmed by the market; there is uncertainty in the wire. As another example, where a client buys securities from their counterparty, and the client doesn't have enough securities available on the settlement date to settle the trade, it is possible that settlement, or only partial settlement, would result in no movement of cash, or only limited movement of cash. Accordingly, because there is not always certainty that a communication will take place on the prediction value date (i.e. the effective date with which a communication becomes part of the account balance), in an embodiment a system and/or user may decide whether a prediction is taken into position, or not. It may be appreciated that in the context of prediction, interest calculations may be based on the account balance for each value date. For example, if the date of a communication is May $1^{st}$, the value date is May $2^{nd}$ and the communication actually posts on May $5^{th}$; the communication may update the balance for May $2^{nd}$ backvalue, even though it only posts on May $5^{th}$, and interest may be applied on the updated balance with value May $2^{nd}$. In an embodiment, once a communication actually takes place on or after the original value date, then the accounting is posted. The resulting posted debits and credits may be understood as the postings related to the communication. In an embodiment, the postings may replace the related predictions, because the predictions would now be included in the account balance after posting.

As used herein, a "prediction" may relate to one of the cash legs of a communication. In an embodiment, a market communication may have 2 predictions, one to debit/credit a client account, and the other one to credit/debit a nostro account. For example, for a payment a debit may go to a client account, and a credit may go to a nostro account. For an internal communication, one client account may be debited and another may be credited, or the communication may debit/credit a client account, and credit/debit an internal account respectively. In an embodiment, there may be more than two predictions for the same communication for a variety of reasons. For example, there may be more than two predictions for the same communication as charges are applied, bulk amounts are split, suspense accounts are required to settle communications, more than one legal entity is involved to settle a communication, a profit/loss needs to be realized, or so on. It may be appreciated that in an embodiment, for each of the separate debits and credits, there is a separate prediction, no matter whether nostro, client, internal or other accounts are involved. In an embodiment, each prediction is a candidate to contribute to the prediction position of the account associated with the prediction.

In an embodiment, not all predictions for the same communication would be received at the same time as one unit of work. For example, the performance management system 130 may receive multiple pieces at different times, from one or more source systems. In an embodiment, any system that can contribute with additional information about a communication may be able to relay it to the performance management system 130, which may match up all the pieces based on unique references. In an embodiment, there may be multiple events for the same prediction. In such an embodiment, the first event may create the actual prediction, while subsequent events (e.g., updates to the prediction) may be received as the communication progresses through its life cycle. In an embodiment, the time at which these events are received may be referred to as the prediction timestamp, which may make available additional information for decisioning purposes, regardless of source. In such an embodiment, the associated details would be the most up to date ones available in real time. In an embodiment, the communication may be for one or more of the financial services provider's legal entities (e.g., going across multiple entities in case one is using the other as their correspondent bank).

In some embodiments, confidence levels may be assigned to communications so that users may determine the appropriate performance amounts. For example, in some embodiments, outputs (e.g., from machine learning models) may indicate current network conditions as a series of probabilities corresponding to respective values for the current network condition. In an embodiment, the systems of the financial services provider may determine when to initiate funding transfers between accounts, or may advise traders of the amount they can cover in the market, for example. It may be appreciated that in an embodiment the prediction functionality 150 may utilize the same communication data that is utilized for the throttling functionality 140, however where the throttling functionality 140 utilizes actual data (e.g., confirmed and final communication data taken at a certain point in time), the prediction functionality 150 may take both the actual data (e.g., the confirmed and final communication data) as well as non-confirmed communication data. In an embodiment, the prediction buckets may be assigned by the performance management system 130 based on prediction rules and/or user decisions.

In an embodiment, predictions may be categorized into different buckets based on the confidence that the financial services provider (e.g., the systems thereof) has that the communications will actually occur. For example, in an embodiment the prediction buckets may include a confirmed bucket, which may be the predictions which have been confirmed by the market. In an embodiment, the correspondent bank or clearing house may confirm the prediction, causing the prediction to be placed in the confirmed bucket. In an embodiment the prediction buckets may include a final bucket, which may be the predictions which have a very high confidence level, even though they have not been confirmed by the market. For example, a prediction for a foreign exchange trade executed by the financial services provider may be placed in the final bucket. In an embodiment, the prediction buckets may include a projected bucket, which may be the predictions which the financial services provider is confident enough to take into position, even though there is no certainty that the prediction will actually occur. For example, the projected bucket may include predictions where the financial services provider has a preadvice of incoming funds which has been confirmed by the client of the financial services provider. In an embodiment, the prediction buckets may include a tentative bucket, which may include the predictions for which the financial services provider has no indication that the prediction will take place, and for which the financial services provider is not sufficiently confident to take the prediction into position. For example, in an embodiment, a prediction for a security settlement trade with a specific failed reason code may be placed in the tentative bucket. Such a failed reason code may include the client of the financial services provider not having sufficient stock to settle the trade, for example. In an embodiment, an undecided bucket may be used to group predictions for which the performance management system 130 cannot make an automated decision. For example, a prediction rule for the prediction may indicate that the communication must be presented to a user for manual decision.

In an embodiment, the performance management system 130 may include into their position the opening statement balance plus confirmed, final, and projected predictions from the prediction functionality 150. In an embodiment, tentative and undecided predictions may be left out of position. It may be appreciated that users of the performance management system 130 may use the position to provide corporate treasury with the amount of performance believed to be available, and may estimate how much should be invested.

In an embodiment, once a communication takes place, the accounting associated with it may be finalized, and the determinations are used to take the predictions down, so that the predictions (for the now final communications) are not used in the prediction buckets. In an embodiment, statistics or other data associated with the correctness of the predictions may be analyzed, or stored for future or cumulative analysis.

As described in greater detail below, in an embodiment the prediction functionality 150 may make use of network triggers. For example, the system may predict a communication settlement time for a communication based on a rule set. In such cases, the system may determine a first characteristic (or trigger) related to the communication and apply the rule set to the first characteristic. For example, the system may determine whether or not a characteristic, which may also be referred to has a network trigger.

Such network triggers may include timed or user initiated triggers, which may represent certain market events, or internal triggers. As an example, the network triggers may include market events such as the opening and closing of the clearing, or a correspondent deadline. Similarly, internal trigger points, such as a set time that the financial services provider decides to reevaluate predictions that aren't final, or a time when the performance management system 130 begins end-of-day positioning processing. In an embodiment, a user may determine if and which automated processes may begin upon reaching the network trigger. For example, upon reaching the network trigger, the prediction functionality 150 may change the prediction bucket. As another example, upon reaching the network trigger, the prediction functionality 150 may consider any new predictions as being "late," as described in greater detail herein. In an embodiment, a user receiving the late prediction may decide whether they wish to still take late predictions into position, for example.

In some embodiments, the prediction functionality 150 may re-bucket prior predictions as the time approaches the market cutoff (e.g., as one of the network triggers), where the likelihood diminishes that the non-final communications will actually occur. It may be appreciated that in an embodiment prediction rules may have a re-bucketing component that may prompt re-bucketing when certain network triggers are met. In an embodiment, the performance management system 130 may present the non-final predictions to users for their decision on whether to include the prediction in the position or not.

In an embodiment, groupings of accounts may be managed together from a prediction perspective. For example, a grouping of nostro accounts in the same currency may be managed together for a particular entity of the financial services provider, which may facilitate managing a single position per entity, or managed on a financial service provider-level so that traders can look for opportunities to trade positions within the financial services provider instead of doing separate market deals to square positions. It may be appreciated that while separate market deals may go in different directions (i.e., borrow or lend), it would be preferable for to instead have one or a few trades within the financial services provider, which may go in the same direction.

In an embodiment, clients and/or their associated predictions may be grouped together for analysis if they belong together (e.g. accounts for the same client) or have similar behavior (e.g. all broker dealer clients tend to manage their account to zero at the end of the day after huge intraday swings). In an embodiment, clients that manage their account to a given balance (zero, positive or negative) can be set up with "predicted balances," so that throughout the day the financial services provider may ignore their individual predictions that create large swings in the prediction positions of the performance management system 130. In an embodiment, the user may at some point determine whether they will continue using the predicted balances, or will look at the actual predictions (e.g., if it is identified that the client is not following its typical behavior). In an embodiment, the performance management system 130 or its users may take prediction "snapshots," which can be subsequently used to reconstruct as to how the predictions and associated positions looked like at the time that each snapshot was taken. In an embodiment, such snapshots may serve as both an audit trail and as an analysis tool. In some embodiments, automated snapshots may be taken at the time that the figures are identified for the traders, or at the time that the prediction is rolled over to the next business day. In an embodiment, users may take snapshots throughout the day (e.g., at their initiative).

In an embodiment, the performance management system 130 may be configured to provide users with access to real time predictions details, which may be acquired from a variety of sources that contribute separate predictions, or enrich predictions from one another with additional details. In an embodiment, the performance manager may accept details for the same communication from various sources, which may use the data to create predictions that contain elements from each of the sources, all for the purpose of having as much as possible complete and up to date information available for making automated or user decisions.

In an embodiment, the performance management system 130 may be configured to allow users to raise manual predictions (e.g., temporarily), in case predictions could come in late. Similarly, in an embodiment, the performance management system 130 may be configured to allow users to create reoccurring predictions, which may include manual predictions that are expected to happen on a daily basis, or on some other reoccurring basis. In an embodiment, informational buckets may be provided, which may allow users to see predictions that have unexpected impacts on positions (e.g., cancellations and late items), or are otherwise outside of normal practice, such as daily reoccurring daily predictions which have not yet, before their expected deadline. In an embodiment, the performance management system 130 may be configured to allow users to focus on material amounts (e.g., the smaller volume of high value amounts, as opposed to a high volume of small value amounts), as such material amounts may have greater impact on the user's predictions and determinations. As such, in an embodiment, the performance management system 130 may be configured to allow users to focus on material amounts first and then move on to significant or non-material amounts. In various embodiments, materiality can be set up to depend on the currency, market, correspondent, or so on.

As described above, it may be appreciated that the prediction functionality 150 may interact with the funding functionality 160 and the trading functionality 170. In an embodiment, once the prediction positions are available, the performance management system 130 may facilitate the user making funding and trading decisions. For example, some users may typically fund most of the associated nostro accounts, so that an acceptable balance is maintained, cash may be concentrated on a particular account that is then covered by traders. In an embodiment, the performance management system 130 may be configured so that users can set up rules that determine the funding pairs, and determine which funding should occur automatically at a given network trigger, or should be proposed for user evaluation. In an embodiment, after analyst users finalize their figures for trader users, trader users may see the analysts' figures appearing as confirmed positions. In an embodiment, after the figures appear as confirmed positions, the trader users may then make their trading decisions. These positions may then be controlled by the traders until they have indicated how they want to use and clear them.

In an embodiment, once actual statement balances are received from the financial service provider's correspondent bank, or the clearing channels that the financial services provider participates in, the performance management system 130 may compare these statement balances against the prediction positions, and may make note of any material differences. In an embodiment, the materiality may be defined by the user. In an embodiment, some positions may be due analysis. It may be appreciated that such positions may be presented to the user with possible explanations. For example, an explanation may include noting communications that potentially explain the difference, such as a communication which occurred with the financial services provider's correspondent that the financial service provider was unaware of. In an embodiment, an explanation may include a note that the received data was confirmed too late to be used when taking predictions into position. In an embodiment, a communication for which the financial services provider decided to not take into position, but which happened after all, may also be noted. It may be appreciated that user analysis of such explanations may allow the user to take corrective actions, if possible, for the next business day.

As noted above, in some embodiments supporting features may be implemented to support the various functionalities described herein, including but not limited to dashboard user interfaces and/or traffic light user interfaces 190, alerting 200, monitoring 210, tangential analytics 220, and machine learning features 230. In an embodiment, the dashboard user interfaces and/or traffic light user interfaces 190 may be configured to provide users with a quick overview of key performance indicators. For example, such an interface may be configured to enable a user to go to from a listing of where they can take actions to the underlying details, so they can take such appropriate actions. In an embodiment, alerts and traffic lights (e.g., alerting 200 and user interfaces 190) may be used to attract attention of the users, in case of identified issues, such as the breach of a defined tolerance level. In an embodiment, monitoring 210 may be configured to allow a user to monitor the financial services provider's cash positions and the status of communications in the clearing systems in real time. In an embodiment, data may be refreshed as an update happens, automated based on an interval, or by manual selection to refresh. In an embodiment, the analytics 220 may be configured to allow data processed by the performance management system 130 to be divided and viewed in a variety of ways, to facilitate user decision making. In an embodiment, machine features 230 may be configured to process prior decisions and outcomes in the past, to support future user decision making and will be described in greater detail below. In particular, the machine learning 230 may find patterns within prior decisions and outcomes in the past for the purposes of making more accurate prediction decisions which lead in better investment of the account balances (e.g. nostro account balances) for increased revenues and reduction in cost. In one embodiment, the machine learning 230 may provide suggested prediction decisions in real time in situations where regular prediction rules cannot make an automated decision or where the user requires additional assistance to make an informed decision. In another embodiment, the machine learning 230 may enhance the regular prediction rules to further refine the automated prediction decisions and improve the accuracy of the decisions as to whether a given prediction should be taken into position or not. For example, in an embodiment prediction may be revisited, as may be modification of appropriate alert levels, maintaining the necessary performance depending on the date and time, providing the chance that a communication will take place based on attributes like who is the client, the counterparty, the correspondent, the type of communication, and so on.

It may be appreciated that in some embodiments, users may define what communication related decisions necessitate multiple levels of review. In an embodiment, approval may be based on how material the amount is, so that users may focus on amounts that have a material impact for a given currency or account. In an embodiment, the performance management system 130 may be configured to facilitate users assigning accounts to teams or individuals, so that they can monitor the progress at any point in time and ensure that all accounts are getting managed on a daily basis even if the person who is usually managing them is absent. In an embodiment, if a user cannot make a prediction bucket decision for whatever reason, they may send a request to the area which has the information or authority to make the decision, such as an operational area like trade settlement, or the client services officer. In an embodiment, the client or other department may incur a charge in case a wrong decision is taken.

While embodiments of the performance management system 130, and in particular the prediction functionality 150 thereof, may vary across embodiments as described herein, an embodiment of the prediction functionality, prediction decisions may link to network trigger processing, as further described in FIG. 3A-B. FIG. 2 illustrates a process flow 240 for automated performance prediction decision-making, which may be implemented on the one or more processors of the performance management system 130.

As shown at 250, in an embodiment the prediction process 240 may occur during the current business date. As such, when an account (e.g., a nostro account) is initially set up, the users determine its first business date. From that point on the account may be rolled over on a daily basis. As part of that roll over, predictions which were received with a future value date and hence a future business date may at some point have the same value date as the designated current business date for prediction, at which time prediction may commence. In an embodiment, any predictions which are not posted on value date may remain outstanding for the current business date. As such, the current business date may contain predictions with a value date equal or smaller to the current business date.

It may be appreciated that a prediction status 260 may track the various stages of prediction an account (e.g., a nostro). Initially, the prediction status 260 might indicate that prediction has not started. When prediction has not yet started, at 260*a*, e.g., after rolling over an account from one business day to the next, a user has not yet started to look actively at the account. Before prediction has started, the predictions and their updates may be collected as usual without being late, because the current business day has yet to begin. For example, if the present day is Wednesday, and an associated market closes at 6 PM, then after all final actions from the users to finish up the Wednesday, they may roll over the nostro account to the next business day (i.e. Thursday), at a designated time (e.g., 6:30 PM). It may be appreciated that users of the performance management system would not look at the Thursday's activity until sometime on Thursday (e.g., late morning or early afternoon, depending on the nostro account).

Once a user is ready to actively start looking at the predictions for the account they can designate the prediction status 260 of the account as prediction, at 260*b*, which may show that the account is now being actively worked on. As an indicator tag for the performance management system 130, the prediction status 260 indicating prediction 260*b* may serve as a useful control mechanism for management, to ensure that the account is timely looked at.

The positioning status, 260*c*, may indicate that the user is in the process of establishing their position. While positioning at 260*c*, new predictions that have an impact for the current business date, or updates which move a prediction from in position to out of position (or vice versa), may be considered late, and may be flagged for a user's decision. In an embodiment the trigger to move the status from prediction at 260*b* to positioning at 260*c* may be reaching a designated time, as all areas which operate the source communication processing systems may be aware of the deadlines with which predictions may need to be provided to the performance analyst users. It may be appreciated that this designated time may be characterized as a network trigger, as described herein.

In an embodiment, a trading & funding status 260*d* may indicate that the performance management system 130 and/or its users (e.g., the traders) are taking the actions to square out the position by funding or investing. In an embodiment, the trigger to move the status from positioning at 260*c* to trading & funding at 260*d* may be user initiated, and may be manually executed when the position is firmed up, and is ready to go into the funding or investment process. In an embodiment, an automated snapshot may be taken after moving the status from positioning at 260*c* to trading & funding at 260*d*, so that the evidence of the position may be kept so that users can go back to it for further reference.

The settlement status 260*e* may indicate that the market is closed for regular customer and interbank payments, as clearing banks are then settling their positions between each other. In an embodiment, the settlement status 260*e* may apply to nostro accounts related to direct cash clearing. In an embodiment, the settlement status 260*e* may be skipped for correspondent banks. It may be appreciated that the trigger to move the status from trading & funding at 260*d* to settlement at 260*e* may be an automated timed one (e.g., as a network trigger) in some embodiments, as settlement is established by the market.

In an embodiment, a closed status 260*f* may indicate that the performance management system 130 may no longer make any further payments or trades. In an embodiment, for direct cash clearing, the timing would correspond to the closure of the clearing system, whereas with a correspondent bank the timing would correspond to the deadline that the correspondent banks have established for accepting payments. In some embodiments, the trigger to move from the trading & funding status 260*d* or settlement status 260*e* to the closed status 260*f* may be an automated timed one (e.g., as a network trigger), as the timing is established by the market or correspondent bank. During the closed status 260*f*, the users may take further actions, such as attending to pending user-approvals (e.g., four-eye approvals). It may be appreciated that such approvals may need to be completed before the current day is closed, or prior to the next business day.

As further shown under the prediction statuses 260, a rolled over status 260*g* may be provided, which may indicate that the business day is fully completed. In an embodiment, the performance management system 130 may be configured to not take any actions during the rolled over status 260g, and positions may be locked down. In an embodiment, the trigger to move the status from the closed status 260f to the rolled over status 260g may be user initiated, and may be manually executed when users have completed all actions for the current day. In an embodiment, an automated snapshot may be taken at the rolled over status 260g, so that the evidence of the position may be kept so that users can go back to it for further reference. In an embodiment, upon roll over at 260g, the prediction for the next business day may activated with a new not started status 260a, so that all predictions would be evaluated against the next day's timeline.

In some embodiments, the system may monitor multi-modal data feed, wherein the multi-modal data feed corresponds to a plurality of types of communication data. For example, the system may receive a first data feed, wherein the first data feed corresponds to a first type of communication data, and the system may receive a second data feed, wherein the second data feed corresponds to a second type of communication data. The system may monitor these feeds for network triggers.

As indicated above, in an embodiment network triggers may be used to modify the processing of the predictions over time. In particular, a network trigger may provide a currency and account agnostic point in the prediction day, where various automated actions can be attached. For example, at a network trigger, the performance management system 130 may change the prediction status, take automated snapshots, re-bucket predictions, or so on. In an embodiment, a network trigger may be provided after which point new predictions and updates to existing predictions may be considered "late," as further described herein. As shown at 270, network trigger processing may be chronologically linked with the prediction status 260, and the business day 250. In an embodiment, users may set up as many network triggers as they desire for driving the various automated actions and prediction rules. In some embodiments, the network triggers may be set up across the whole performance management system 130, or across systems of the financial services provider (e.g., the subsystems 110). In an embodiment, network triggers may be used to customize the timed behavior of each account (e.g., nostro account). It may be appreciated that a network trigger may or may not apply to a particular account (e.g., nostro account). It may be appreciated that network triggers may be triggered manually by a user, or automatically at a given time, in various embodiments. In an embodiment, the manual or automatic triggering may be customized at the account (e.g., nostro) level so that there is flexibility as to how users wish to operate a particular account. As an example, a start network trigger 270a may change the prediction status 260 to prediction 260b. In an embodiment, a re-bucketing network trigger 270b may be used during one or more re-bucketing processes, described in greater detail below. In an embodiment, a late network trigger 270c may be associated with application of a late flag to subsequent predictions, and may indicate the securities settlement deadline. In an embodiment, a processing network trigger 270d may change the prediction status 260 to positioning 260c, and may also be used by prediction rules for setting the late flag in some embodiments. In an embodiment, a cut position network trigger 270e may change the prediction status 260 to trading & funding 260d, and may take an automated snapshot. In an embodiment, a market settlement network trigger 270f may change the prediction status 260 to settlement 260e. In an embodiment, a market closure network trigger 270g may change the prediction status 260 to closed 260f. In an embodiment, a roll over network trigger 270h may change the prediction status 260 to not started 260a for the next business day. In an embodiment, the roll over processing may occur at the roll over network trigger 270h. In an embodiment, a snapshot may be taken at the roll over network trigger 270h.

In some embodiments, the system may use a first tier of a two-tiered machine learning architecture to detect network triggers. For example, the system may generate outputs from machine learning models that are trained to predict current performance conditions of a respective type based on historic communication data of the respective type. The system may use this output to detect a network trigger.

In an embodiment, an account timeline (e.g., a nostro timeline) may be set up, allowing users to customize the behavior of the account. For example, the account timeline may customize the account by selecting which network triggers apply, specifying whether they will be triggered automatically at a predetermined time or will be triggered by a user, and specifying a time which will serve as an automated trigger at the predetermined time, or indicative time by which it is expected that a user should have triggered the network trigger. In an embodiment, such an indicative time on an account timeline may be used for dashboarding in order to report whether actions are timely taken, or a delay is experienced.

In an embodiment, an automated process may run periodically (e.g., every minute) and may search for any time related set ups which are designated as a time trigger. As such, this network trigger server process may routinely scan a plurality of different nostro or other account timelines to determine if one or the other account timelines has a network trigger coming up. In an embodiment, if it is determined that a network trigger is reached, then the network trigger server process may determine if there are any prediction rule(s) that are set up with re-bucketing for the network trigger, and/or if there are any automated actions attached to the network trigger. In an embodiment, when a network trigger is reached for one or more prediction rule(s), the performance management system 130 may search for predictions which meet the criteria of the rule(s) and the account for which the network trigger was reached. If predictions are found, then the prediction bucket may be changed as per the setup. In an embodiment, when a network trigger is hit for one or more automated actions, the system may execute the predetermined action(s) as per the setup.

In an embodiment, the times on the account timeline may be set up by the user in the local market time (e.g., the time zone where the account is held). In an embodiment, these timings may be translated to UTC (Coordinated Universal Time) so that the network trigger server may have standardized timings across all time zones. In an embodiment, the network trigger server may be configured to account for changes in daylight savings time for each time zone.

It may be appreciated that the prediction snapshots described above may describe how predictions looked at the time a snapshot is taken. In various embodiments, snapshots can be taken automatically at certain network triggers or manually by the user. Users can associate the snapshot function with certain network trigger as part of the setup in addition to the ones that are already predetermined for them, such as upon cutting the prediction position for the performance decisions (funding between nostros or the trader's investment), and upon roll over to the next business day. In an embodiment, the roll over snapshot may be the final snapshot of the day, and may be used the next day for comparing against the actual balance, so that material differences can be identified, and corrective actions taken, where applicable. In an embodiment, the snapshot data may store the timestamp at the time of the snapshot. Accordingly, in an embodiment when a user wants to go back to a snapshot (on the same business day or going back to previous days) they may select from a list of available snapshots, after which the system may reconstruct the data on the user interface to the same situation as what a user saw at the time that they took the snapshot. In an embodiment, the requested timestamp may be compared against extensive audit trail logging which may enable the user to return back to the predictions in their state of the time that the snapshot was taken.

As noted above, a communication typically has two or more legs (e.g., predictions). In an embodiment, all legs for the same communication may receive the same prediction decisions, which may reduce the risk that the decisions wouldn't be the same (as may be the case if prediction rules were applied separately). For example, it is possible that there is a prediction rule for a specific nostro account, which would not be hit if the prediction for a client account runs through. Accordingly, in an embodiment, the performance management system 130 may determine a lead prediction for the communication, as shown at 280 of process 240. The lead prediction may be understood as a prediction that runs through the rules, before its decision is propagated to all other predictions for the same communication (if other predictions exist). It may be appreciated that this technique may be beneficial to system performance, as it is not pushing every single prediction through the rule, draining system resources.

In an embodiment, the determination of the lead prediction may be based on the availability of a prediction for an account (e.g., a nostro). For example, if the communication has one prediction for a nostro account, then the prediction for that nostro goes through the prediction rules. In the unusual case where a communication has more than one prediction for a nostro account then the prediction for the nostro with the worst deadline (as set up with a particular network trigger on the nostro timeline) may go through the rules. In other cases, such as when there are no predictions for a nostro account available for a communication, as is the case for a book transfer where one client account gets debited and another client account gets credited, for example, then the first prediction that is picked up by the system may go through the rules, or the prediction may be selected at random.

In an embodiment, the performance management system 130 may provide the functionality to exclude certain accounts from being discovered as a nostro when determining the lead prediction. For example, such exclusion may be used in the nostro-vostro relationship between legal entities of the same banking group. For example, with a UK entity of a banking group with head office in the US making use of its head office for making a USD payment, if a client of the UK entity initiates a USD payment, the accounting entries and predictions will therefore be a debit to the client of the UK entity in the books of the UK entity, a credit to the nostro which represents the account that the UK entity holds with its US entity in the books of the UK entity, a debit to the UK's entity client account with the US entity, which is the so called "vostro," in the books of the US entity, and a credit to the nostro which represents the account that the US entity holds in the US clearing (Fed or Chips) in the books of the US entity. It may be appreciated that the nostro-vostro relationship may be internal, and the true market facing nostro is the one held by the US entity. Therefore the nostro-vostro relationship may be set up to be eliminated from the lead prediction determination, and in such an example only one nostro might be retained (e.g., the nostro held by the US entity in the US clearing).

In an embodiment, an exception where not all predictions for the same communication get the same decision may relate to contractual communications. It may be appreciated that communications are either "actual" or "contractual." They may be considered actual if both the client and the nostro (i.e. market account) get debited and credited with the actual postings after the communication is finalized/confirmed. However, for contractual communications, the client's side may be posted regardless of whether the communication finalizes in the market or not. Therefore for contractual communications, the client's side will be decided upon as being final and may be assigned to the final bucket, whereas the nostro/market side may follow the regular prediction rules, which will move it through the various buckets as the communication moves through its lifecycle. In an embodiment, if a user makes a decision on one of the predictions of a communication, then all predictions for the same communication may inherit the same decision. Such inheritance may ensure consistency across all predictions for the same communication, and may avoid that the user would have to make repetitively the same decision for each of the predictions for the same communication. Again, the contractual communication may be an exception to this.

Having determined a lead prediction at 280, prediction rules 290 may be applied. In an embodiment, the prediction rules may make three prediction decisions: assign a prediction bucket, prediction status, and late flag to new predictions, and re-evaluate these decisions as the communication processing systems send in later updates for them. These decisions are triggered by the arrival of a new prediction or the update of an existing one upon any change to the prediction attributes. The prediction rules 290 may also support the network trigger server to automatically reevaluate earlier decisions at specific times, and re-bucket them if necessary. Such re-bucketing may comprise moving the predictions from one prediction bucket to another. In an embodiment, the decision may be triggered by a timed process. For example, the attributes of the prediction might not change, but the prediction with the current attributes may be in an unexpected prediction bucket at a given point in time and is therefore re-bucketed.

In an embodiment, each prediction rule 290 may have associated therewith four components: prediction attributes 300, re-bucketing network triggers 310, a late prediction network trigger 320, and a prediction decision 330, as discussed in greater detail below.

In an embodiment, a rule may be set up making use of the significance of the amount (i.e. how large it is, and hence how material the impact would be if an incorrect prediction decision is made). The tolerance for error may be different from once currency to another or even from one account to another in various embodiments. In an embodiment, the performance management system 130 may be configured to allow a user to define amount ranges to determine what amounts are considered to be material amounts, significant amounts, and non-material amounts. Whether an amount is material to the users, or not, may depend on factors such as the overall volume and value of a currency or the activity that goes through a particular account, local regulations (e.g.

the balance cannot exceed a certain amount, or even worse the correspondent bank initiates a foreign exchange to sell off the excess), interest conditions, or so on. In an embodiment, this technique of materiality may be used for putting a prediction in the undecided bucket, as it may allow a user to focus on the lower volume important material decisions, instead of slowing them down and presenting them with a high volume of non-significant amounts.

In an embodiment, by defining prediction rules which make use of broad concepts of network triggers and material amounts it may be possible to work with a limited number of broader prediction rules which may cover all markets, currencies and deadlines. The amount ranges and the exact timings of the network triggers for each of the currencies and the individual nostros may vary across embodiments, in particular if they have a different behavior than the currency of the nostro. In an embodiment, the broad prediction rules may avoid setting up an excessive number of prediction rules in order to differentiate every market's own behavior. It may be appreciated that in some embodiments prediction rules may be established for specific currencies and nostros, because they are indeed part of the prediction attributes 300. In an embodiment, if a particular currency or nostro has a different behavior then the same rule for all the other currencies or accounts, then an exception rule may be prioritized over a broader rule.

In an embodiment, the prediction attributes 300 may be provided by the source communication processing system (s), and may range from the communication reference, to the type of communication, to the value date, and so on. In an embodiment, a subset of the attributes 300 may be used as a deciding factor as to whether a prediction should go into one prediction bucket versus another. In various embodiments, prediction attributes may include one or more of the currency of the communications, the legal entity initiating the communication, the nostro account involved in the communication, the country where the nostro is held, the type of communication and its source communication processing system, the status of the communication on the source communication processing system, the status of the communication on the accounting system, the reason for not having a finalized status, and the materiality of the amount (i.e. how large or small it is). Other attributes 300 may also be applied to the prediction rules 290, or certain attributes 300 might not apply to certain communications. In an embodiment, the attributes 300 may be adapted to the available attributes which a given communication processing system can provide, and which make sense for that particular system and communication.

The system may generate prediction attributes 300, using an aggregation layer for the first machine learning model and the second machine learning model, a third feature input based on the first output and second output. For example, the system may create a feature input based on prediction attributes 300. The system may then determine, based on the third feature input, a first rule set from a plurality of rule sets for predicting communication settlement times.

In an embodiment, prediction attributes 300 may be used to identify the rule that should be applied to a given prediction. For example, the system may determine a specific rule set from a plurality of rule sets for predicting communication settlement times based on current network conditions (e.g., as indicated by prediction attributes 300).

In an embodiment, rules may be established in an order of priority, where a prediction may run through the rules in this order. In an embodiment, when the attributes of the predictions match the ones set up for the rule, then that rule is applied, and the prediction might not consider any of the rules with a lower priority. In an embodiment, the order of the rules may be defined so that exceptions have a higher priority, and the rules which become less stringent have a lower priority. As an example, rules for specific types of communications from a number of source systems, such as payment and securities settlement systems, may have a higher priority than a 'catch-all' rule with the lowest priority. In an embodiment, the catch-all rule may put the prediction in an undecided bucket if none of the earlier rules were hit. In an embodiment, various attributes may be combined within the same prediction rule. The regular available query operands and selection criteria can be applied, including but not limited to and, or, =, < >, <, <=, >, >=, in, not in, like, between, not between, and substring.

As described above, prediction buckets may be categories or groupings of predictions, based on the confidence level that the prediction will actually occur. In an embodiment, one or more of the prediction buckets may include a confirmed bucket, where it is guaranteed that the communication will be finalized, a final bucket, where there is a very high level of confidence that the communication will be finalized, a projected bucket, where there is a high level of confidence that the communication will be finalized, a tentative bucket, where there is a low level of confidence that the communication will be finalized, and an undecided bucket for user determination of the prediction bucket. In an embodiment, re-bucketing may be the process of re-evaluating earlier prediction decisions at specific times, and moving predictions from one prediction bucket to another if need be.

The new bucket can be the undecided bucket for the purpose of automatically highlighting the predictions to the users, so that the ones which require user attention are presented to them, as opposed to the users needing to search for them. In an embodiment, this allows the users to make an informed decision which may involve contacting an operational area within the financial services provider or the client or counterparty, to verify the status of the communication. In an embodiment, an example of such a communication may be a client preadvising a receipt of funds where the confirmation of the receipt of funds is not yet received after the market has been open for most of the day and now the deadline is approaching. In an embodiment, the timing threshold may be controlled by a user set up. It may be appreciated that the prediction rule for this type of communication may be set up to put the prediction in the "projected" bucket. With re-bucketing, users can add a re-bucketing network trigger (e.g., re-bucketing network trigger 270b) to this rule, in order to find such an unconfirmed item at the desired time and move it to the "undecided" bucket. This will take the prediction out of position until the user decides to put it back into position by putting it back into the projected bucket or keep it out of position by putting it into the tentative bucket, for example.

In an embodiment, the new bucket can also be a bucket other than the "undecided" bucket. Here the user doesn't need to take a decision and the automated process can do it on behalf of the user. For example, one such communication may be a client's DVP securities trade (delivery of securities versus cash payment) where it is expected to receive securities from the counterparty against the client paying cash. In some embodiments, the prediction rule would be set up to put this communication in the "projected" bucket as long as the settlement confirmation is not received. In an embodiment, if there is no confirmation of the settlement of the trade before the securities settlement deadline in that particular market for that particular type of security (e.g., a Swedish government bond), then re-bucketing may be considered depending on the reason as to why the trade is failing. For example, if the reason is related to the counterparty not having the securities available to settle the trade, then the user may decide to set the prediction rule up in such a way to find these particular unconfirmed items at the desired time, and move them automatically to the "tentative" bucket without pushing them to the 'undecided' bucket, which may avoid the users taking any action, as they would always make the same decision.

In some embodiments, multiple re-bucketing network triggers may be established for the same rule, which may move communications between buckets as the day in a particular market progresses. For example, this may be the case for a market where the (temporary) local market conditions are such that the strategy for the performance decisions is to avoid holding a long balance and have a preference to end up with a short balance instead of a long balance (even though this can cause extra overdraft interest charges).

Returning R to the preadvice example discussed above, in an embodiment, the rule could be set up to move the preadvice from "projected" to "undecided" at a given network trigger. In addition to that, when it is time to establish the performance position the re-bucketing network trigger can put them back in "projected" from "undecided", regardless as to whether or not confirmation was received. This would give the users the benefit of knowing what was "unconfirmed" to follow up on the non-receipt of funds. In an embodiment, unless there is certainty that the funds won't be received (at which time they would be put in the "tentative" bucket), the system may be configured to automatically put them back into the "projected" bucket, so that they would be taken into position. In an embodiment, if further updates from the communication processing system are received after re-bucketing, then they can still get bumped up to a bucket with a higher confidence level as confirmations are received.

In the preadvice example described above, the re-bucketing rule may have put the prediction into "undecided" at a time before the deadline. If the user hasn't made a decision yet, or has already decided to put it in either "tentative" or "projected" bucket, keeping it out or putting it back into position respectively, then if confirmation is received before the late network trigger, the prediction rule may then move the prediction in either the "final" or "confirmed" bucket, depending on from whom the confirmation was received. In case the confirmation was received from the institution where the account is held (e.g., the central bank clearing or correspondent bank) then the rule would put it into the "confirmed" bucket. However if the confirmation was received under the form of an "announcement" sent by the paying bank advising that they will make a payment to the central bank or correspondent account, then the rule may put the prediction into the "final" bucket. In the latter case, it is possible that the confirmation from the institution where the account is held is received after or before the announcement, as messages come in from different parties it is perfectly possible that they come in in any order. If the message is received after, then the re-bucketing may be from the "final" to the "confirmed" bucket. If received before, then there wouldn't be a change in bucket upon the arrival of the announcement, as it wouldn't bump down the level of confidence because the item was already confirmed by a more reliable source (i.e. from the institution where the account is held, as opposed to a third party).

As described herein, use of network triggers may facilitate a user identifying late predictions, which may draw the user's attention to the fact that a new prediction has arrived, or an existing prediction was updated for the current business date, at the time that they are firming up their position for making the performance decision, or even after the performance position was already taken. Accordingly, a late flag 320 may be assigned by the prediction rules, depending on whether the data was received before or after the late network trigger (e.g., late network trigger 270c). In an embodiment, the network trigger server might not be used for the determination of the prediction late flag. Indeed, in an embodiment as a new prediction is acquired or an update is received for an existing prediction, then the time at which it is processed may be compared to the nostro timeline and its network triggers. In an embodiment, if the prediction comes in for a value date before or equal to the business date, and the time is after a late network trigger as per the prediction rules, then it will get the late flag. In other cases, it might not be considered late.

After applying the prediction rules at 290 including the attributes 300, re-bucketing 310, and late flag 320, a prediction decision 330 may be made. As shown in FIG. 3B, in an embodiment the decision may be based on the prediction status, the prediction bucket, and the prediction late flag. In an embodiment these decisions may initially be taken as a new prediction is received. Then, as updates to an existing prediction are received (if any), the decisions may be revisited as the updated prediction attributes 300 may lead to a different decision, as a different prediction rule 290 may apply. In an embodiment, a user can then change all or some of these decisions, as they see fit. In an embodiment, another decision, whether the prediction is taken into position or left out of position, may subsequently be made. It may be appreciated that this subsequent decision, described in greater detail below, may be indirectly based on the combination of the above decisions.

As shown at 340, the prediction rules may assign a prediction status to each prediction. In an embodiment, an active prediction status 340a may be related to an active communication which hasn't yet posted. As such, the active prediction status 340a may be used for prediction, and thus may be included in the prediction buckets for the current business day. In an embodiment, a posted prediction status 340b may be related to a finalized communication which has already posted. As such, the posted prediction status 340b may therefore no longer used for prediction, because it is already included in the account balance, and may be excluded from the prediction buckets for the current business day. In an embodiment a cancelled status 340c may be related to a cancelled communication which will therefore never take place. As such, the communication may be removed and no longer used for prediction, because it will never post. The canceled prediction would then be excluded from the prediction buckets for the current business day.

As shown at 350, the prediction bucket component of the prediction decision-making may bucket predictions into categories based on the confidence level that they will actually occur. As indicated above, the prediction bucket assigned to each prediction may subsequently be updated by a user, as desired. As variously described herein, a confirmed prediction 350a may be those predictions which have been confirmed by the market (i.e. by the correspondent, central bank, or clearing house). For example, a confirmed prediction 350a may apply when a payment is sent to the cash clearing or a correspondent bank and they return a confirmation after they have settled the communication. A final prediction 350*b* may include those predictions which aren't yet confirmed by the market, but there is a very high confidence level that they will occur. For example, a final prediction 350*b* may apply when a payment is sent to the cash clearing or a correspondent bank then, under normal circumstances, there is no reason as to why this payment wouldn't be executed. A projected prediction 350*c* may include those predictions for which there is no absolute certainty that they will take place but there is enough confidence to take them into position. For example, a projected prediction 350*c* may apply where a client has preadvised incoming funds and they have confirmed that the funds will indeed be received. A tentative prediction 350*d* may include those predictions for which there is no positive indication that they will take place and there is therefore not enough confidence to take them into position. For example tentative prediction 350*d* may apply where a security settlement trade with a failed reason code of the counterparty not having enough securities to settle the trade is likely to fail for the current business day. In an embodiment, an undecided prediction 350*e* may be those predictions for which a user is required to make a decision. In an embodiment, specific rules can determine that user intervention is required, or if no rule is found, then by default they may be presented to a user.

In some embodiments the level of confidence may increase as a communication goes through a communication life cycle. For example if a payment is received before value date then it may be likely to get assigned to the projected bucket 350*c*. Then on the value date when the payment is sent to the market, after ensuring that the client has enough funds or overdraft line, the confidence level may increase and hence the prediction bucket 350 may be increased to the final bucket 350*b*. After confirmation is received from the market that the payment was executed, the prediction bucket 350 may be increased to the confirmed bucket 350*a*.

As further shown in FIG. 3B, a prediction late flag 360 may be assigned by the prediction rules. This functionality may enable the user to freeze their position at a time of their choice (e.g., upon reaching a particular network trigger) and let the performance management system 130 present any changes that come in after that. Such an arrangement may be beneficial as the user or trader can potentially still alter their performance decision if there is a material impact or organize another funding transfer or trade if the deadlines aren't yet reached and there is still time to react. In an embodiment, if it is too late to take a corrective action then predictions with a late flag may potentially explain the next day why the prediction position is different from the statement balance received from the institution where the account is held. For example if a client sends in a late preadvice that they expect to receive funds, and it is too late to take an action, then the closing account balance with the other bank may be long if the funds are indeed received. In an embodiment, the system may be configured so the user can remove the late flag if they were still able to include it in their position. This may also apply to predictions on the back of funding and investment decisions as by the nature of the communication they will come in late. It may be appreciated that, because they were taken into account for the purpose of squaring out the position, they are known and expected, so the users may remove their late flag. In an embodiment, the late flag would apply to the current business day. If the prediction doesn't post, and hence remains outstanding for the next business day, then the late flag may be removed, because from the next day's perspective, the prediction is no longer late (as the next day is only about to start).

Depending on the combination of the values of the prediction decisions, a prediction may be taken into position or left out of position, as determined at 370. In an embodiment, in order for a prediction to qualify to be taken into position, the prediction would have active status, be in either the confirmed or final or projected prediction bucket, and not have a late flag. In an embodiment, any deviation from this would disqualify the prediction from being taken into position. Accordingly, a prediction may be left out of position if the prediction has either a cancelled or posted status, has a tentative or undecided prediction bucket, or has a late flag.

After deciding whether to take the prediction into position or leave it out of position, the decision may be applied to the other predictions for the same communication, as shown at 380. Specifically, once the prediction decision has been taken for the lead prediction, there is a process to apply the decision to all the other predictions for the same communication, if any. As noted above, an exception may exist for contractual communications. In an embodiment, the prediction nostro position may then be determined. The prediction nostro position may be used for funding the nostros, or may be provided to the traders for their investment. In an embodiment, the prediction nostro position may be calculated as the sum of the opening balance, plus the total of the confirmed, final, and projected predictions (which represent a high and fair confidence level). In an embodiment, tentative and undecided predictions are left out of position.

In many embodiments, predictions are received from the source communication processing applications. However, it is also possible to raise a manual prediction for the purpose of making a (temporary) manual adjustment. In an embodiment, manual predictions should be short lived, as they should be replaced by an actual communication later on. The manual predictions would then serve as a placeholder to enable the user to change the prediction balances if need be. When manual predictions are entered by the user, they don't go through the prediction rules. Instead, the user assigns the appropriate prediction bucket, status and late flag. Once raised, the user can update these with the decisions as usual. In an embodiment, the manual predictions can be entered with the source communication processing system reference, in case it is known. As an example, if the communication link between the communication processing system and the performance system would be down, a manual prediction may be utilized. If a communication is received later on from the source communication processing system with the same reference, then the manual prediction continues its life with the updates from the source system attached to it. In an embodiment, the process may proceed through the prediction rules as usual from that point on.

From the disclosure above, it may be appreciated that a method of processing performance prediction decisions may be viewed from the perspective of the performance management server 130. Accordingly, as illustrated in FIG. 4, in an embodiment a method for processing performance prediction decisions 390 may start at 400, and proceed at 410 by receiving a prediction for an account at a given prediction timestamp.

Method 390 may then continue at 420 by identifying a prediction rule using attributes from the prediction. For example, in some embodiments, the attributes that can be used to identify the prediction rule may include one or more of a currency of the communication, a legal entity initiating the communication, a nostro account involved in the communication, a nostro holding country, a communication type, a source communication processing system, a communication status associated with a source communication processing system, a communication status associated with an accounting system, a reason for not being final, and an amount materiality. Other attributes may additionally or alternatively be used to identify the prediction rule in some embodiments.

It may be appreciated that the prediction rule identified at 420 may include therein network triggers, as described in greater detail above. As such, where the prediction rule has a network trigger associated with it, method 390 may proceed at 430 by retrieving a network trigger time associated with the network trigger. In an embodiment, the network trigger time may be retrieved from the account associated with the prediction. As indicated above, such network trigger times may be in coordinated universal time. It may be appreciated from the disclosure herein that the network trigger times may determine how the prediction is treated in the method. Accordingly, method 390 may continue at 440 by comparing the prediction timestamp (which may also be converted into coordinated universal time, or otherwise accounted for) to the network trigger time.

As shown at 450, method 390 may continue by applying a prediction decision based on the comparison of the prediction timestamp and the network trigger time. It may be appreciated that applying the prediction decision may comprise determining a confidence level that a communication associated with the prediction will occur by a given time (e.g., where earlier predictions or predictions using more reliable data sources may be treated with a greater level of confidence than later predictions or predictions using third hand information), as described above. Finally, in an embodiment, method 390 may end at 460.

In an embodiment, the method 390, or portions thereof, may be part of a larger decision-making process. For example, as illustrated in FIG. 5A, an embodiment of an automated performance prediction decision-making process 470 may include therein various features of the method 390. In an embodiment, the process 470 may comprise a loop that processes a prediction for a particular account (e.g., starting at 480). As shown, at 490, prediction rules 500 may be retrieved using attributes from the prediction. Once the prediction rule is identified at 510, process 470 may determine at 520 whether network triggers are associated with the prediction rule. If network triggers from the rule are identified at 530, process 470 may proceed at 540 by retrieving times associated with all identified network triggers for the prediction, using the account from the prediction. As shown, retrieving the network trigger times may be via a network trigger process 550, described in greater detail below.

Process 470 may then continue at 560 by determining if there is at least one time identified for a network trigger. If network trigger time(s) are identified at 570, then process 470 may continue at 580 by comparing an update timestamp from the prediction to the identified network trigger times. Following the comparison, if multiple network trigger times are identified, process 470 may continue at 590 by determining which network trigger applies, before making use of prediction decisions associated with the identified network trigger, at 600.

It may be appreciated that no network triggers are associated with the prediction rule (as determined at 520), or if there is not at least one time identified for a network trigger (as determined at 560), process 470 may proceed by making use of prediction decisions that have no associated network triggers, at 610. Regardless of which prediction decisions are used (at 600 or 610), process 470 may continue by making all prediction decisions, at 620.

In an embodiment, making the prediction decisions at 620 may include making use of the prediction bucket at 630. Prediction bucketing is described in greater detail above. As indicated at 640, in an embodiment the prediction bucket may be confirmed, final, projected, tentative, or undecided. In an embodiment, the prediction bucket may be determined at 650, as discussed above. In some embodiments, other considerations may ascertain the outcome of decision-making. For example, in an embodiment, the decision-making may include whether the status of the source system maps to an active prediction status, at 660. If not, a non-active status 670 may be indicated, while if so, an active status 680 may be indicated. Accordingly, a prediction status may be determined at 690. In an embodiment, making the prediction decisions at 620 may include determining at 700 if there was an identified network trigger, and if so, was it designated as late. If there was not a late network trigger, then at 710, a not-late flag may be designated (which in an embodiment, might be understood as the absence of a late flag). If there is a late network trigger, then at 720 a late flag may be applied to the prediction. Accordingly, at 730, a prediction late-flag is determined.

In some embodiments, process 470 may continue by determining whether predictions should be taken into position or left out of position. Accordingly, in an embodiment, as illustrated at 740, if the status is active (e.g. at 680), the prediction late flag is not late (e.g., at 710), and the bucket at 640 is confirmed, final, or projected (as determined at 640), then the prediction may be taken into position at 750. If not, then the prediction may be left out of position, at 760. Accordingly, the prediction may be completed with all decisions applied at 770, and the prediction decision process 470 may end at 780. In an embodiment, the process 470 may loop (as indicated at 790, by returning to the start at 480.

As further shown in FIG. 5A, and as discussed above, in an embodiment the network trigger process 550 may be a timed process that may run concurrently with the decision-making process (e.g., process 470). In an embodiment, the network trigger process 550 may be part of the decision-making process (e.g., process 470). As shown at 800 in FIG. 5A, in an embodiment the network trigger process 550 may be a timed process, which may determine if a network trigger is reached for a particular account at a particular time. As shown at 810, the network trigger process 550 may determine if one or more network triggers were found. If so, then process 550 may continue at 820 by determining any prediction rules which make use of the network trigger. With the identified rule and accounts to which the prediction rules apply for the queried time, network trigger process 550 may continue at 830 by searching for predictions meeting the criteria. If one or more predictions are found (at 840 of FIG. 5A), then for each identified prediction, the bucket decision may be applied as per the identified rule with the applicable associated network trigger, as illustrated at 850. It may be appreciated that such bucket decisioning may be fed into determining the prediction bucket 650, as described above. If, in an embodiment, no network triggers were found at 810, or no predictions were found at 840, then network trigger process 550 may return to 860, which may hold off on action until the next time the process runs. Accordingly, 860 may loop back to 800 for further processing.

In an embodiment, the method 390, or portions thereof, may include a machine learning and prediction decision-making process 900. For example, as illustrated in FIG. 6A-C, an embodiment of a machine learning and prediction decision-making process 900 may include therein various features of the method 390. In an embodiment, the machine learning and prediction decision-making process 900 may be configured to process prior decisions and outcomes in the past, to support future user and automated decision making. In an embodiment, machine learning and prediction decision-making process 900 may find patterns within prior decisions and outcomes in the past for the purposes of making more accurate prediction decisions which lead to better investment of the account balances (e.g. nostro account balances) resulting in increased revenues and reduction in cost. For example, the machine learning and prediction decision-making process 900 may provide suggested prediction decisions in real time in situations where regular prediction rules cannot make an automated decision or where the user requires additional assistance to make an informed decision. In another example, the machine learning and prediction decision-making process 900 may enhance the regular prediction rules to further refine the automated prediction decisions and improve the accuracy of the decisions as to whether a given prediction should be taken into position or not.

In an embodiment, the process 900 may comprise a loop that processes one or more predictions for one or more particular accounts. As shown, at 910, predictions may be processed as described above. Specifically, prediction rules may be retrieved using attributes from the prediction at 910a. Once the prediction rule is identified at 910a, one or more prediction decisions are made which may include making use of the prediction bucket at 910b. Prediction bucketing is described in greater detail above. In an embodiment, the prediction bucket may be confirmed, final, projected, tentative, or undecided. In an embodiment, the prediction bucket may be determined at 910b, as discussed above. In an embodiment, at 910c, the decision-making process may determine the prediction position at the positioning deadline (i.e. network trigger) associated with a prediction position by adding all active predictions in the completed, final and projected buckets to the opening balance, as described in greater detail above. For example, the positioning deadline may be the time the system provides a position to a trader or the time at which the system moves money around between nostro accounts. A prediction status may be determined as being completed in a step 910d. In some embodiments, process 910d may determine whether predictions should be posted or cancelled. Accordingly, the prediction may be completed with all decisions at 910d, and the prediction decision process may end. In an embodiment, the process may loop (by returning to the start at 910a) each time an event is received for a prediction with an active status.

In an embodiment, a process 920 may extract communication data associated with the completed predictions and communications. It should be appreciated that a completed event includes predictions and communications with a posted or cancelled status. The communication data may include raw communication data of all events and prediction details associated with completed predictions and communications. In one embodiment the communication data may include predictions in any prediction bucket i.e. confirmed, final, projected, tentative and undecided buckets. At 920a, the communication data may be extracted from the automated performance prediction decision-making process and system and provided to a machine learning environment at 920b.

As further shown in FIG. 6B, the communications data may be received at the machine learning environment and evaluated after the fact to determine the accuracy of the prediction decisions at 930. In other words, the communications data associated with the complete predictions and communications may be evaluated by the machine learning environment to determine the accuracy of each prediction decision for each day that the prediction was outstanding. In one embodiment, the communication data associated with each completed prediction and communication may be evaluated according to one or more methodologies. For example, process 930 may identify, from the communication data of all completed prediction events, all the business days for which prediction decisions were made at 930a. At 930b, an identification of the event which completed each prediction is determined. For each prediction, the prediction decisions made for each of the business days that the prediction was outstanding may be evaluated against that prediction's completion event. It should be appreciated that the days that need to be evaluated may include the day of the original value date (value date of the first event when prediction was acquired) and continue up and include the day the prediction is completed.

Process 930 may continue by identifying the last event before the positioning deadline for each day to be evaluated at 930c. It should be appreciated that the prediction or position decision for a given business day may be taken based on this event. In one embodiment, if no such event is found for a given business day, a virtual event based on the last event available on the next earlier day may be created. At 930d, a decision tree may be utilized to calculate the prediction decision that should have been made for each day to be evaluated. In other words, the decision tree may be used to evaluate whether the prediction decision for each business day is the correct or most accurate decision made. As shown in the exemplary decision tree table at 930e, the decision tree may input the prediction status upon completion (posted v. cancelled), completion date (last business day that the prediction was taken into consideration for positioning), final value date (value date of last event which completes the prediction), date that is being evaluated, and the prediction buckets on the last event for the day that is being evaluated. In one embodiment, the completed, final and projected buckets may be considered to have been taken IN position, whereas the tentative and undecided buckets may be considered to have been taken OUT position. In one embodiment, the output of the decision tree is an evaluation as to whether the decision for that day that is being evaluated was correct.

In an embodiment, process 900 may further continue to evaluate the communications data with various machine learning models to render a decision as to whether a particular prediction with specific attributes should have been taken into position, or not, and provide a level of confidence for that decision in 940. As shown in 940a, the models may include, but are not limited to, algorithms such as the "Logistic Regression" model and the "Gradient Boosted" model. These models have proven to provide better results than explicate rule-based algorithms. In one embodiment, the machine learning models may learn from one or more training data sets after which quality of the evaluation is determined with a test data set at 940b. In another embodiment, the machine learning models are then exposed to a prediction processing engine which is utilized for real time decision making at 940c.

As further shown in FIG. 6A, process 900 may include real time prediction decision utilizing the machine learning models described above at 950. In one embodiment, a prediction is initially processed as described above. Specifically, prediction rules may be retrieved using attributes from automated performance prediction decision-making method processing the prediction at 950*a*. Once the prediction rule is identified at 950*a*, one or more prediction decisions are made which may include making use of the prediction bucket at 950*b*. Prediction bucketing is described in greater detail above. In an embodiment the prediction bucket may be confirmed, final, projected, tentative, or undecided. In an embodiment, the prediction bucket may be determined at 910*b*, as discussed above. If the prediction rules cannot make a decision and a prediction decision is placed in the undecided bucket at 950*c*, a request is sent for a real time prediction decision utilizing the machine learning models at 950*d*. In one embodiment, machine learning models may provide the prediction processing engine a real time prediction decision for each prediction placed in the undecided bucket. In another embodiment, the machine learning models may provide the prediction processing engine, in real time, a decision of IN or OUT position; a level of confidence percentage, where 100% represents a very high confidence result and the level of confidence decreases as the percentage lowers; and a list of contributing factors or attributes that added most weight to reach the decision.

Upon receipt of the real time prediction decision from the machine learning models, model specific prediction rules defined by the user may be applied at 950*e*. For example, the user may define specific prediction rules relating to a confidence level percentage thresholds for material, significant and non-material amounts. In one embodiment, the output of the applied model specific prediction rules may include direction as to whether the provided decision leads to an automated decision or whether the undecided bucket is assigned to the user to intervene and make a decision. In case the automated decision is taken, the IN position may move the prediction to the projected bucket and the OUT position to the tentative bucket. For example, assume that the material bucket for a USD nostro is defined as requiring greater than 100 million and a confidence level of 95% in order to automate the decision. If a prediction for USD 1 billion comes back with 96% confidence level then the decision is automated, but if the prediction only has a 94% confidence level then it may be presented to the user.

In an embodiment, if the decision is not automated then the user can decide to assign either the projected or tentative bucket independent of what the model suggested at 950*g*. The user may be presented with the details that the model provided, including the attributes that contributed to the suggested decision so that the user can make the best possible decision based on the available information.

In an embodiment, process 900 may further continue by providing real time assistance to a user at 960. For example, in the event that the user is reviewing a prediction, independent of its prediction bucket at 960*a*, a user may request assistance from the model in order to obtain further details which may assist them in their decisions. A request is sent to the model at 960*b* after which a response is provided back to the user at 960*c*. The results are rendered on the UI, similarly as to what is available to the user after a prediction goes automatically to the model as part of the automated decision flow.

As further shown in FIG. 6B, the prediction processing engine may provide enhanced prediction rules at 970. In one embodiment, communication data is evaluated with various machine learning models for the purpose of enhancing the prediction rules in order to further automate prediction decisions and improve the accuracy of the decisions at 970*a*. Examples of the machine learning models include, but are not limited to, the "Association Rule Mining" model and the "Information Value Statistic" model. At 570*b*, the output of the machine learning models enable the user to analyze the accuracy achieved by each of the rules, discover patterns as to where decisions were right vs. wrong, relations between variables contributing to the outcome, and suggestions as to how the accuracy can be lifted. After their analysis, users have the opportunity to change both the prediction rules that are used when new or updates to existing predictions come in, as well as to the rules that are established to handle the suggested decisions made by the model at 570*c*.

In one embodiment, the communication data of the completed communications is extracted from the prediction processing engine on a regular basis at 580*a* and provided to the machine learning environment for the purpose of continued training of the machine learning models to further increase the model's accuracy at 580*b*.

Those skilled in the art will appreciate that the embodiments described herein can be implemented using a server, computer, database, communications and programming technology, each of which implements hardware or software or any combination thereof. Embodiments of this disclosure may be implemented in the form of a computer program product on a computer-readable storage medium having computer-readable program code means embodied in any suitable computer-readable storage medium, including hard disks, CD-ROM, RAM, ROM, optical storage devices, magnetic storage devices, and/or the like.

For example, FIG. 7 illustrates a high level block diagram of an exemplary computer system 1000 which may be used to perform embodiments of the algorithms and processes disclosed herein. It may be appreciated that in some embodiments, the system performing the processes herein may include some or all of the computer system 1000. In some embodiments, the computer system 1000 may be linked to or otherwise associated with other computer systems 1000. In an embodiment the computer system 1000 has a case 1010, enclosing a main board 1020. The main board has a system bus 1030, connection ports 1040, a processing unit, such as Central Processing Unit (CPU) 1050, and a data storage device, such as main memory 1060, storage drive 1070, and optical drive 1080. Each of main memory 1060, storage drive 1070, and optical drive 1080 may be of any appropriate construction or configuration. For example, in some embodiments storage drive 1070 may comprise a spinning hard disk drive, or may comprise a solid-state drive. Additionally, optical drive 1080 may comprise a CD drive, a DVD drive, a Blu-ray drive, or any other appropriate optical medium.

Memory bus 1090 couples main memory 1060 to CPU 1050. The system bus 1030 couples storage drive 1070, optical drive 1080, and connection ports 1040 to CPU 1050. Multiple input devices may be provided, such as for example a mouse 1100 and keyboard 1110. Multiple output devices may also be provided, such as for example a video monitor 1120 and a printer (not shown). In an embodiment, such output devices may be configured to display information regarding the processes disclosed herein, including but not limited to the prediction decisions, whether predictions are taken into position or left out of position, and so on. It may be appreciated that the input devices and output devices may alternatively be local to the case 1010 and the computer system 1000, or may be located remotely (e.g., interfacing with the computer system 1000 through a network or other remote connection).

Computer system 1000 may be a commercially available system, or may be proprietary design. In some embodiments, the computer system 1000 may be a desktop workstation unit, and may be provided by any appropriate computer system provider. In some embodiments, computer system 1000 comprise a networked computer system, wherein memory storage components such as storage drive 1070, additional CPUs 1050 and output devices such as printers are provided by physically separate computer systems commonly tied together in the network. Those skilled in the art will understand and appreciate the physical composition of components and component interconnections comprising computer system 1000, and select a computer system 1000 suitable for performing the methods disclosed herein.

When computer system 1000 is activated, preferably an operating system 1130 will load into main memory 1060 as part of the boot sequence, and ready the computer system 1000 for operation. At the simplest level, and in the most general sense, the tasks of an operating system fall into specific categories: process management, device management (including application and user interface management) and memory management.

In such a computer system 1000, the CPU 1050 is operable to perform one or more embodiments of the methods described above. Those skilled in the art will understand that a computer-readable medium 1140, on which is a computer program 1150 for performing the methods disclosed herein, may be provided to the computer system 1000. The form of the medium 1140 and language of the program 1150 are understood to be appropriate for computer system 1000. Utilizing the memory stores, such as one or more storage drives 1070 and main system memory 1060, the operable CPU 1050 will read the instructions provided by the computer program 1150 and operate to perform the methods disclosed herein, such as processes 470, 390, 240 and/or the functionality described as pertaining to the performance management system 130 (including but not limited to providing the prediction functionality 150).

It may be appreciated that some embodiments the CPU 1050 (either alone or in conjunction with additional CPUs 1050) may be configured to execute one or more computer program modules 1160, each configured to perform one or more functions of the processes described herein. For example, in the illustrated embodiment, at a CPU 1050 operated by the financial service provider, a computer program module 1160 may be configured to receive a prediction. It may be appreciated that the CPU 1050 may be at the performance management system 130, and the prediction may be generated using cash balance and communication data 120 received from the subsystems 110 of the financial services provider. In an embodiment, prediction may comprise data associated with one or more storage drives 1070, accessible by the CPU 1050 directly or indirectly (e.g., via the system bus 1030, or via a network that may be internal to and/or external to the financial services provider). Accordingly, in an embodiment each of the financial subsystems 110 may comprise their own CPUs and storage systems.

It may be appreciated that the one or more computer program modules 1160 may be configured to identify the prediction rule using attributes from the prediction, retrieve network trigger times for network triggers associated with the rule, compare the prediction timestamp with the network trigger time, and apply the prediction decision based on the comparison, as variously described above. It may be appreciated that other features of the various methods and processes described herein may additionally be performed by the one or more computer program modules 1160 operating on the CPU 1050, in coordination with other features of the system 1000.

It may be appreciated that in an embodiment, a computer program module 1160 may be configured to transmit, for viewing on an electronic display communicatively linked with the one or more processors 1050, a graphical user interface, which may be displayed on a display (such as the display 1120). It may be appreciated that the graphical user interface may facilitate transmission of instructions from the user to the performance management system 130, which may instruct the computer system 1000 to perform the methods (e.g., methods and processes 240, 390, 470) as described above. It may be appreciated that various actions associated with performing the methods described herein may occur in series or in parallel. Accordingly, it may be appreciated that the program modules 1160 may each be linked with each other, on the same CPU 1050, or across a plurality of CPUs 1050. In effect, in an embodiment, a plurality of modules 1160, operating over one or more CPUs 1050, may cooperate with one another to perform the methods described herein.

FIG. 8 shows a flowchart of the steps for predicting communication settlement times across disparate computer networks based on computer and network performance and communication load through the use of a two-tiered machine learning architecture. For example, process 800 may comprise one or more steps for generation recommendation and/or predictions based on communication settlement times.

At step 802, process 800 (e.g., using one or more components described in system 100 (FIG. 1)) receives data feeds. For example, the system may receive a first data feed, wherein the first data feed corresponds to a first type of communication data. The system may also receive a second data feed, wherein the second data feed corresponds to a second type of communication data.

In some embodiments, receiving the first data feed and the second data feed may further comprise receiving a multi-modal data feed, wherein the multi-modal data feed corresponds to a plurality of types of communication data. The system may then segregate the multi-modal data feed into the first data feed and the second data feed. For example, the multi-modal data feed may comprise data related to current computer and network performance and communication load across the disparate computer networks. For example, the system may receive communication data, which may include data about one or more network conditions. In some embodiments, the network conditions may correspond to conditions used to forecast liquidity needed across a transaction network (e.g., a network of entities that are creating, settling, engaging in, and/or facilitating transactions).

For example, the system may be used by an entity that is sending payments across countries. The entity may need to know when a transaction (or a series of transactions) may settle (e.g., be completed). In complex systems this may be several days in the future or over several days. The system may need to know how much money (e.g., liquidity) would need to settle outstanding balances. This issue may be especially applicable to securities custodians. Custodians may need to clear settlements in the background (e.g., in order to allow a user to buy/sell same day trades). The system may determine that some securities may occur on one day and the system may predict when it may happen. This is multi-modal information (e.g., clearances of other banks, buy/sell information, currency fluctuations, trading activity data, network bandwidth, available liquidity, etc.)

At step 804, process 800 (e.g., using one or more components described in system 100 (FIG. 1)) generates feature inputs. For example, the system may generate a first feature input based on the first data feed. The system may also generate a second feature input based on the second data feed. For example, the system may receive data on current network conditions (e.g., where (e.g., what geographic area) communications (e.g., transactions) are being sent/received, what type of currency is being used, what types of clients (e.g., financial institution, communication, family offices, etc.), what type of communication (e.g., what type of security is involved in the transaction)). The system may then determine a feature input (e.g., a vector of values representing the particular condition).

For example, the system may use one or more machine learning model to determine the current network conditions that may in turn be used to predict when a transaction may settle and/or how much liquidity is needed. For example, each machine learning model may be trained on a different type of the communication data (e.g., a type of currency, who is engaged in a transaction, what type of entity is engaged in a transaction, etc.). For example, involved governments, historical transactions may indicate current network conditions (e.g., settlement characteristics). The historical transaction may relate to both sender and receiver and/or the networks that transactions are sent and receive in. The system may also use the number of different governments and/or specific conditions related to a government to determine current network conditions. For example, some clients may have multiple entities and different entities may correspond to different governments and legal entities. Accordingly, transactions for these clients may include multiple governments. The system may both look for group characteristics (e.g., based on a type of client) as well as client specific characteristics and/or pull both group profiles and user profile.

The system may also use the type of communications (e.g., government backed securities may trigger a different network triggers than other securities) and/or information in the communications. For example, the information that the communications are providing may say that they are buying specific securities or a buy an amount.

At step 806, process 800 (e.g., using one or more components described in system 100 (FIG. 1)) generate first and second outputs. For example, the system may input the first feature input into a first machine learning model to generate a first output, wherein the first machine learning model is trained to predict current performance conditions of the first type based on historic communication data of the first type, and wherein the first output indicates a first current network condition of the first type. The system may also input the second feature input into a second machine learning model to generate a second output, wherein the second machine learning model is trained to predict current performance conditions of the second type based on historic communication data of the second type, and wherein the second output indicates a second current network condition of the second type. For example, the first output may indicate the first current network condition of the first type as a series of probabilities corresponding to respective values for the first current network condition.

At step 808, process 800 (e.g., using one or more components described in system 100 (FIG. 1)) generates a third feature inputs based on the first and second outputs. For example, the system may generate, using an aggregation layer for the first machine learning model and the second machine learning model, a third feature input based on the first output and second output. For example, the system may process the first feature input through the first machine learning model in parallel with the second feature input through the second machine learning model. The system may then use the results of this parallel processing as inputs for the aggregation layer.

At step 810, process 800 (e.g., using one or more components described in system 100 (FIG. 1)) determines a rule set. For example, the system may determine, based on the third feature input, a first rule set from a plurality of rule sets for predicting communication settlement times.

At step 812, process 800 (e.g., using one or more components described in system 100 (FIG. 1)) receives a first communication. For example, the system may receive a first communication. In some embodiments, the system may receive multiple communications. For example, the system may receive a second communication. The system may then predict a second communication settlement time for the second communication based on the first rule set, wherein the recommendation is further based on the second communication settlement time. At step 814, process 800 (e.g., using one or more components described in system 100 (FIG. 1)) predicts a communication settlement time. For example, the system may predict a first communication settlement time for the first communication based on the first rule set. In some embodiments, predicting the first communication settlement time for the first communication based on the first rule set may further comprises determining a first characteristic of the first communication and applying the first rule set to the first characteristic. For example, the first characteristic may correspond to whether the first communication (e.g., a first transaction) is dependent on a second communication (transaction).

At step 816, process 800 (e.g., using one or more components described in system 100 (FIG. 1)) generates for display a recommendation. For example, the system may generate for display, on a user interface, a recommendation based on the first communication settlement time. For example, the system may determine current liquidity (e.g., provide a liquidity forecast) for an entity. For example, a user (e.g., a bank) may send money (e.g., "load availability") in a particular country, bank in that country, and in that currency, and/or money in that account based on current liquidity forecasts as recommendation based on one or more communication settlement times.

In some embodiments, the system may determine an aggregated communication load (e.g., liquidity) at a first time based on the first communication settlement time. The system may then compare the aggregated communication load at the first time to a threshold aggregated communication load (e.g., an available liquidity). The system may then determine the recommendation based on comparing the aggregated communication load at the first time to a threshold aggregated communication load.

In some embodiments, the system may determine an aggregated communication load at a first time (e.g., at some point in the future) based on the first communication settlement time. The system may then determine an amount of required performance availability based on the aggregated communication load. The system may then determine the recommendation based on the amount of required performance availability.

It is contemplated that the steps or descriptions of FIG. 6A-C may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the steps, devices, or equipment discussed in relation to FIGS. 1-5 could be used to perform one or more of the steps in FIG. 6A-C.

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A system for predicting communication settlement times across disparate computer networks, comprising: storage circuitry configured to: store a first tier of a machine learning architecture, wherein the first tier comprises: a first machine learning model; a second machine learning model; and an aggregation layer for the first machine learning model and the second machine learning model; second tier of the machine learning architecture, wherein the second tier comprises a plurality of rule sets for predicting communication settlement times; control circuitry configured to: receive a first data feed, wherein the first data feed corresponds to a first type of communication data; receive a second data feed, wherein the second data feed corresponds to a second type of communication data; generate a first feature input based on the first data feed; generate a second feature input based on the second data feed; input the first feature input into the first machine learning model to generate a first output; input the second feature input into the second machine learning model to generate a second output; generate, using the aggregation layer for the first machine learning model and the second machine learning model, a third feature input based on the first output and second output; determine, based on the third feature input, a first rule set from a plurality of rule sets for predicting communication settlement times; receive a first communication; predict a first communication settlement time for the first communication based on the first rule set; determine an aggregated communication load at a first time based on the first communication settlement time; determine an amount of required performance availability based on the aggregated communication load; and determine a recommendation based on the amount of required performance availability; and cloud-based input/output configured to generate for display, on a user interface, the recommendation based on the first communication settlement time.

2. A method for predicting communication settlement times across disparate computer networks, comprising: receiving a first data feed, wherein the first data feed corresponds to a first type of communication data; receiving a second data feed, wherein the second data feed corresponds to a second type of communication data; generating a first feature input based on the first data feed; generating a second feature input based on the second data feed; inputting the first feature input into a first machine learning model to generate a first output; inputting the second feature input into a second machine learning model to generate a second output; generating, using an aggregation layer for the first machine learning model and the second machine learning model, a third feature input based on the first output and second output; determining, based on the third feature input, a first rule set from a plurality of rule sets for predicting communication settlement times; receiving a first communication; predicting a first communication settlement time for the first communication based on the first rule set; and generating for display, on a user interface, a recommendation based on the first communication settlement time.

3. The method of any preceding embodiment, wherein receiving the first data feed and the second data feed further comprises: receiving a multi-modal data feed, wherein the multi-modal data feed corresponds to a plurality of types of communication data; and segregating the multi-modal data feed into the first data feed and the second data feed.

4. The method of any preceding embodiment, wherein the multi-modal data feed comprises data related to current computer and network performance and communication load across the disparate computer networks.

5. The method of any preceding embodiment, further comprising: receiving a second communication; and predicting a second communication settlement time for the second communication based on the first rule set, wherein the recommendation is further based on the second communication settlement time.

6. The method of any preceding embodiment, further comprising: determining an aggregated communication load at a first time based on the first communication settlement time; comparing the aggregated communication load at the first time to a threshold aggregated communication load; and determining the recommendation based on comparing the aggregated communication load at the first time to a threshold aggregated communication load.

7. The method of any preceding embodiment, further comprising: determining an aggregated communication load at a first time based on the first communication settlement time; determining an amount of required performance availability based on the aggregated communication load; and determining the recommendation based on the amount of required performance availability.

8. The method of any preceding embodiment, wherein the first output indicates the first current network condition of the first type as a series of probabilities corresponding to respective values for the first current network condition.
9. The method of any preceding embodiment, further comprising processing the first feature input through the first machine learning model in parallel with the second feature input through the second machine learning model.
10. The method of any preceding embodiment, wherein predicting the first communication settlement time for the first communication based on the first rule set further comprises: determining a first characteristic of the first communication; and applying the first rule set to the first characteristic.
11. The method of any preceding embodiment, wherein the first characteristic corresponds to whether the first communication is dependent on a second communication.
12. A non-transitory, computer readable medium for predicting communication settlement times across disparate computer networks, comprising: receiving a first data feed, wherein the first data feed corresponds to a first type of communication data; receiving a second data feed, wherein the second data feed corresponds to a second type of communication data; generating a first feature input based on the first data feed; generating a second feature input based on the second data feed; inputting the first feature input into a first machine learning model to generate a first output; inputting the second feature input into a second machine learning model to generate a second output; generating, using an aggregation layer for the first machine learning model and the second machine learning model, a third feature input based on the first output and second output; determining, based on the third feature input, a first rule set from a plurality of rule sets for predicting communication settlement times; receiving a first communication; predicting a first communication settlement time for the first communication based on the first rule set; and generating for display, on a user interface, a recommendation based on the first communication settlement time.
13. The method of any preceding embodiment, wherein receiving the first data feed and the second data feed further comprises: receiving a multi-modal data feed, wherein the multi-modal data feed corresponds to a plurality of types of communication data; and segregating the multi-modal data feed into the first data feed and the second data feed.
14. The method of any preceding embodiment, wherein the multi-modal data feed comprises data related to current computer and network performance and communication load across the disparate computer networks.
15. The method of any preceding embodiment, wherein the instructions further cause operations comprising: receiving a second communication; and predicting a second communication settlement time for the second communication based on the first rule set, wherein the recommendation is further based on the second communication settlement time.
16. The method of any preceding embodiment, wherein the instructions further cause operations comprising: determining an aggregated communication load at a first time based on the first communication settlement time; comparing the aggregated communication load at the first time to a threshold aggregated communication load; and determining the recommendation based on comparing the aggregated communication load at the first time to a threshold aggregated communication load.
17. The method of any preceding embodiment, wherein the instructions further cause operations comprising: determining an aggregated communication load at a first time based on the first communication settlement time; determining an amount of required performance availability based on the aggregated communication load; and determining the recommendation based on the amount of required performance availability.
18. The method of any preceding embodiment, wherein the first output indicates the first current network condition of the first type as a series of probabilities corresponding to respective values for the first current network condition.
19. The method of any preceding embodiment, wherein the instructions further cause operations comprising processing the first feature input through the first machine learning model in parallel with the second feature input through the second machine learning model.
20. The method of any preceding embodiment, wherein predicting the first communication settlement time for the first communication based on the first rule set further comprises: determining a first characteristic of the first communication, wherein the first characteristic corresponds to whether the first communication is dependent on a second communication; and applying the first rule set to the first characteristic.

What is claimed is:
1. A system for predicting communication settlement times across disparate computer networks, comprising:
storage circuitry configured to:
store a first tier of a machine learning architecture, wherein the first tier comprises:
a first machine learning model;
a second machine learning model; and
an aggregation layer for the first machine learning model and the second machine learning model;
store a second tier of the machine learning architecture, wherein the second tier comprises a plurality of rule sets for predicting communication settlement times;
control circuitry configured to:
receive a first data feed, wherein the first data feed corresponds to a first type of communication data;
receive a second data feed, wherein the second data feed corresponds to a second type of communication data;
generate a first feature input based on the first data feed;
generate a second feature input based on the second data feed;
input the first feature input into the first machine learning model to generate a first output;
input the second feature input into the second machine learning model to generate a second output;
generate, using the aggregation layer for the first machine learning model and the second machine learning model, a third feature input based on the first output and second output;
determine, based on the third feature input, a first rule set from a plurality of rule sets for predicting communication settlement times;
receive a first communication;

predict a first communication settlement time for the first communication based on the first rule set;
determine an aggregated communication load at a first time based on the first communication settlement time;
determine an amount of required performance availability based on the aggregated communication load; and
determine a recommendation based on the amount of required performance availability; and
cloud-based input/output configured to generate for display, on a user interface, the recommendation based on the first communication settlement time.

2. A method for predicting communication settlement times across disparate computer networks, comprising:
receiving a first data feed, wherein the first data feed corresponds to a first type of communication data;
receiving a second data feed, wherein the second data feed corresponds to a second type of communication data;
generating a first feature input based on the first data feed;
generating a second feature input based on the second data feed;
inputting the first feature input into a first machine learning model to generate a first output;
inputting the second feature input into a second machine learning model to generate a second output;
generating, using an aggregation layer for the first machine learning model and the second machine learning model, a third feature input based on the first output and second output;
determining, based on the third feature input, a first rule set from a plurality of rule sets for predicting communication settlement times;
receiving a first communication;
predicting a first communication settlement time for the first communication based on the first rule set; and
generating for display, on a user interface, a recommendation based on the first communication settlement time.

3. The method of claim 2, wherein receiving the first data feed and the second data feed further comprises:
receiving a multi-modal data feed, wherein the multi-modal data feed corresponds to a plurality of types of communication data; and
segregating the multi-modal data feed into the first data feed and the second data feed.

4. The method of claim 3, wherein the multi-modal data feed comprises data related to current computer and network performance and communication load across the disparate computer networks.

5. The method of claim 2, further comprising:
receiving a second communication; and
predicting a second communication settlement time for the second communication based on the first rule set, wherein the recommendation is further based on the second communication settlement time.

6. The method of claim 2, further comprising:
determining an aggregated communication load at a first time based on the first communication settlement time;
comparing the aggregated communication load at the first time to a threshold aggregated communication load; and
determining the recommendation based on comparing the aggregated communication load at the first time to a threshold aggregated communication load.

7. The method of claim 2, further comprising:
determining an aggregated communication load at a first time based on the first communication settlement time;
determining an amount of required performance availability based on the aggregated communication load; and
determining the recommendation based on the amount of required performance availability.

8. The method of claim 2, wherein the first output indicates the first current network condition of the first type as a series of probabilities corresponding to respective values for the first current network condition.

9. The method of claim 2, further comprising processing the first feature input through the first machine learning model in parallel with the second feature input through the second machine learning model.

10. The method of claim 2, wherein predicting the first communication settlement time for the first communication based on the first rule set further comprises:
determining a first characteristic of the first communication; and
applying the first rule set to the first characteristic.

11. The method of claim 10, wherein the first characteristic corresponds to whether the first communication is dependent on a second communication.

12. A non-transitory, computer readable medium for predicting communication settlement times across disparate computer networks, comprising:
receiving a first data feed, wherein the first data feed corresponds to a first type of communication data;
receiving a second data feed, wherein the second data feed corresponds to a second type of communication data;
generating a first feature input based on the first data feed;
generating a second feature input based on the second data feed;
inputting the first feature input into a first machine learning model to generate a first output;
inputting the second feature input into a second machine learning model to generate a second output;
generating, using an aggregation layer for the first machine learning model and the second machine learning model, a third feature input based on the first output and second output;
determining, based on the third feature input, a first rule set from a plurality of rule sets for predicting communication settlement times;
receiving a first communication;
predicting a first communication settlement time for the first communication based on the first rule set; and
generating for display, on a user interface, a recommendation based on the first communication settlement time.

13. The non-transitory computer readable medium of claim 12, wherein receiving the first data feed and the second data feed further comprises:
receiving a multi-modal data feed, wherein the multi-modal data feed corresponds to a plurality of types of communication data; and
segregating the multi-modal data feed into the first data feed and the second data feed.

14. The non-transitory computer readable medium of claim 13, wherein the multi-modal data feed comprises data related to current computer and network performance and communication load across the disparate computer networks.

15. The non-transitory computer readable medium of claim 12, wherein the instructions further cause operations comprising:
   receiving a second communication; and
   predicting a second communication settlement time for the second communication based on the first rule set, wherein the recommendation is further based on the second communication settlement time.

16. The non-transitory computer readable medium of claim 12, wherein the instructions further cause operations comprising:
   determining an aggregated communication load at a first time based on the first communication settlement time;
   comparing the aggregated communication load at the first time to a threshold aggregated communication load; and
   determining the recommendation based on comparing the aggregated communication load at the first time to a threshold aggregated communication load.

17. The non-transitory computer readable medium of claim 12, wherein the instructions further cause operations comprising:
   determining an aggregated communication load at a first time based on the first communication settlement time;
   determining an amount of required performance availability based on the aggregated communication load; and
   determining the recommendation based on the amount of required performance availability.

18. The non-transitory computer readable medium of claim 12, wherein the first output indicates the first current network condition of the first type as a series of probabilities corresponding to respective values for the first current network condition.

19. The non-transitory computer readable medium of claim 12, wherein the instructions further cause operations comprising processing the first feature input through the first machine learning model in parallel with the second feature input through the second machine learning model.

20. The non-transitory computer readable medium of claim 12, wherein predicting the first communication settlement time for the first communication based on the first rule set further comprises:
   determining a first characteristic of the first communication, wherein the first characteristic corresponds to whether the first communication is dependent on a second communication; and
   applying the first rule set to the first characteristic.

* * * * *